(12) United States Patent
Jang et al.

(10) Patent No.: US 12,546,484 B2
(45) Date of Patent: Feb. 10, 2026

(54) APPLIANCE

(71) Applicant: LG ELECTRONICS INC., Seoul (KR)

(72) Inventors: Seungtae Jang, Seoul (KR); Moon Ho Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 261 days.

(21) Appl. No.: 18/229,479

(22) Filed: Aug. 2, 2023

(65) Prior Publication Data

US 2024/0044508 A1    Feb. 8, 2024

(30) Foreign Application Priority Data

Aug. 2, 2022  (KR) .................. 10-2022-0096377

(51) Int. Cl.
*F24C 15/08*    (2006.01)
*E05F 15/00*    (2015.01)

(52) U.S. Cl.
CPC .............. *F24C 15/08* (2013.01); *E05F 15/00* (2013.01); *E05Y 2201/426* (2013.01); *E05Y 2201/638* (2013.01); *E05Y 2900/308* (2013.01)

(58) Field of Classification Search
CPC ........ F24C 7/082; F24C 15/003; F24C 15/08; E05F 15/00; E05Y 2201/426; E05Y 2201/638; E05Y 2900/308
See application file for complete search history.

(56) References Cited

U.S. PATENT DOCUMENTS

| 2,808,497 | A  | * | 10/1957 | Kesling ................ F24C 7/082 |
|           |    |   |         | 219/448.11 |
| 8,726,791 | B2 |   | 5/2014  | Adamczak et al. |
| 2010/0206414 | A1 |   | 8/2010  | Adamczak et al. |
| 2016/0320067 | A1 |   | 11/2016 | Dachs et al. |
| 2018/0070757 | A1 |   | 3/2018  | Lee et al. |
| 2020/0029721 | A1 | * | 1/2020  | Kang .................... A47J 36/00 |

FOREIGN PATENT DOCUMENTS

| CN | 206251501     | 6/2017  |
| DE | 10 2012 224033 | 6/2014 |
| EP | 2518413       | 10/2012 |
| EP | 3594573       | 1/2020  |
| JP | 2018-094416   | 6/2018  |
| KR | 10-2015-0030016 | 3/2015 |
| WO | WO 2015/086247 | 6/2015 |
| WO | WO 2018/084462 | 5/2018 |

OTHER PUBLICATIONS

Extended European Search Report dated Dec. 15, 2023, issued in Application No. 23189205.0.

* cited by examiner

*Primary Examiner* — James O Hansen
(74) *Attorney, Agent, or Firm* — KED & ASSOCIATES, LLP

(57) ABSTRACT

Disclosed herein is a cooking appliance. In the cooking appliance, a control panel opening and closing the front surface of an electronic component space opens the front surface of the electronic component space while swiveling downward, and opens the front surface of the electronic component space while being unfolded forward.

16 Claims, 22 Drawing Sheets

APPLIANCE

CROSS-REFERENCE TO RELATED APPLICATION(S)

This application claims priority to and the benefit of Korean Patent Application No. 10-2022-0096377, filed in Korea on Aug. 2, 2022, the disclosure of which is incorporated herein by reference in its entirety.

BACKGROUND

1. Field

The present disclosure relates to a cooking appliance, and in particular, a cooking appliance provided with a door for opening and closing a cooking space.

2. Background

Cooking appliances may be installed in the kitchen and used to cook food items. Cooking appliances can fall into different categories, based on a heat source or a type, and the sort of fuel. Additionally, cooking appliances can be categorized into an open cooking appliance in which a food item is placed in an open space, and a sealed cooking appliance in which a food item is placed in a closed space, based on a way of cooking a food item. Examples of the sealed cooking appliance comprise an oven, a microwave oven and the like, and examples of the open cooking appliance comprise a cooktop, a hob and the like.

In the sealed cooking appliance, a space in which a food item is placed may be shielded to be enclosed and insulated, and the shielded space may be heated to cook the food item. The sealed cooking appliance may include a cooking space in which a food item is placed and in which a food item is cooked. The cooking space may be closed or otherwise shielded while a food item is being cooked.

Sealed cooking appliances may be categorized into gas ovens and electric ovens based on the type of a heat source. Gas ovens use a gas, such as methane, as a fuel and cook a food item by using flames that are generated by supplying gas to a burner and igniting the burner. Unlike gas ovens, electric ovens use electricity as a heat source and cook a food item by using heat that is emitted from an electric heater.

In recent years, steam ovens have come on the market and cook a food item by using high-temperature steam. Steam ovens spray high-temperature steam into a cooking space, and adjust humidity and temperature based on an amount of the steam, preventing a food item from drying and potentially cooking a large amount of food in stages. Additionally, steam ovens can provide a function of maintaining taste and flavor of cooked food and the like.

A steam oven typically includes a cabinet forming the exterior of the steam oven, a cavity disposed in the cabinet and forming a cooking space to receive the steam, a door opening and closing the front opening of the cooking space, and a steam supplier supplying steam into the cooking space. The steam supplier can include a steam generator generating steam, and a water supplier supplying water to the steam generator. A water supply pipe may connect the water supplier and the steam generator, to allow water in a water tank to move to the steam generator. The steam generator may include a water storage that accommodates water supplied from the water supplier, and a heater that heats the water in the water storage and generates steam. In the steam oven, water injected through the water supplier flows into the water storage through the water supply pipe, the water having flown into the water storage may be heated by the heater to generate steam, and the generated steam flows into the cooking space and circulates in the cooking space, to cook a food item.

In the steam oven, the water supplier can be disposed in an electronic component space that may be a space formed separately of the cooking space. The water supplier can be provided such that the water supplier may be drawn to the front of the electronic component space. The water supplier can comprise a housing and a water tank. The housing may be fixed to the electronic component space. The housing has an accommodation space therein, the accommodation space accommodating the water tank, and the front surface of the housing may be open forward. The water tank may be installed in the housing such that the water tank can move in the accommodation space of the housing in the front-rear direction, and the water tank can be withdrawn through the front of the electronic component space.

A front panel can be provided at the front of the cavity defining the cooking space. The front panel can be disposed at the front of the cavity and form the exterior of the front surface of the steam oven. The front panel can form the exterior of the front surface of the steam oven while shielding the front edge area of the cavity. Additionally, a portion of the front panel can extend upward above the cavity, and may be disposed at the front of the electronic component space. A portion of the front panel, disposed at the front of the electronic component space may cover the electronic component space from the front of the electronic component space.

The front panel formed, as described above, can form the exterior of the front surface of the steam oven, which may be exposed as the door opens the cooking space. The front panel can form the exterior of the front surface of the steam oven while shielding the front edge area of the cavity and the electronic component space from the front thereof.

The steam oven may be further include a control panel for displaying the operation adjustment and the operation state of the steam oven. The control panel may be disposed above the door closing the cooking space. The water tank can pass through the front panel disposed at the front of the electronic component space and be drawn to the front of the electronic component space. To this end, the front panel may have an open hole that forms a passage through which the water tank passes. The open hole may be disposed in an area between the cooking space and the control panel.

The open hole may be exposed when the door opens the cooking space, and the open hole may be not exposed when the door closes the cooking space. Thus, in the state where the door opens the cooking space, the water tank can be drawn, and in the state where the door closes the cooking space, the open hole and the water tank may be not exposed externally.

Additionally, in the case of a steam oven that has a size less than that of the steam oven structured as described above, i.e., a steam oven that has a cooking space of capacity less than that of the steam oven structured as described above or a steam oven that has an entire size less than that of the steam oven structured as described above while having the same capacity as that of the steam oven structured as described above, a distance between the cooking space and the control panel can be less than that of the steam oven structured as described above. In the smaller steam oven (hereafter, "a small-and-medium-sized steam oven"), a space for installing the water supplier may be not be available between the cavity in which the cooking space may be formed and the control panel.

For the water supplier to be disposed between the cooking space and the control panel, a sufficient gap between the upper surface of the cavity and the control panel needs to be ensured in the up-down direction. However, it may be difficult to ensure the gap in a small-and-medium-sized steam oven. To ensure such a gap in a small-and-medium-sized steam oven, the small-and-medium-sized steam oven can have an excessively long up-down length, compared to the entire size of the small-and-medium-sized steam oven.

In the small-and-medium-sized steam oven, the control panel may serve as a cover covering the electronic component space from the front of the electronic component space, instead of the front panel. Accordingly, the water supplier, in particular, the water tank, may be disposed in an area behind the control panel. In the case where the water tank may be disposed in the area behind the control panel as described above, an access hole may be formed on the control panel and form a passage through which the water tank passes. Since the access hole formed on the control panel may be exposed to the outside of the steam oven constantly, the access hole can degrade the aesthetic qualities of the steam oven.

An example of a first home appliance comprising a movable control panel is discussed in European Patent No. EP 3080517 (corresponding to U.S. Patent Publication No. 2016-0320067). The first home appliance includes a storage space accommodating components of the home appliance and disposed at the upper side of the home appliance. The control panel may be disposed at the upper side of a door and may cover the front surface of the storage space. The control panel may move in the up-down direction. When the control panel moves upward, the storage space can be accessed. Accordingly, a tank can readily be removed from the storage space or inserted into the storage space. When the control panel moves downward, the front surface of the storage space may be covered by the control panel, and access to the storage space and the tank inserted into the storage space may be limited.

According to this first home appliance having a movable control panel, the path of movement of the control panel may be divided into a first path and a second path. Between a closing position in which the control panel closes the storage space and an opening position in which the control panel opens the storage space totally, the first path may be a lower section comprising the closing position, and the second path may be an upper section between the end of the first path and the opening position.

In the first path, the control panel can be moved by a moving device comprising a driving motor. In the second path, a motor driving force may be not applied to the control panel, and the control panel may be moved based on the user's manipulation. Thus, the control panel moves automatically in the first path, and then moves manually in the second path, such that the storage space of the control panel may be open. According to configuration, the storage space opened and closed by the control panel may be not open completely. An automatic movement of the control panel can lead to a partial opening of the storage space. To open the storage space completely, the user needs to perform a manual manipulation additionally to move up the control panel manually. For example, in this home appliance, the control panel needs to be manipulated manually to access the tank, causing inconvenience to the user.

Additionally, the control panel may be disposed very close the upper end of the door. In the case where a manual manipulation may be performed in this position to move up the control panel manually, the user may be exposed to heat discharged from the upper end of the door and an area around the upper end of the door. For example, for the first home appliance, the control panel needs to be manipulated manually to ensure access to the tank, causing inconvenience to the user and increasing the risk of injuries of the user due to heat from opening the door.

According to this first home appliance having a movable control panel, the control panel moves upward to open the storage space. The control panel moved upward may be placed between the user's eyes and the tank. The control panel disposed as described above may become an obstacle that covers the tank from the user's sight. Accordingly, in the process of drawing or inserting the tank, the tank may be not seen well, causing inconvenience to the user, and the user needs to bend such the user's eye level may be placed under the control panel.

A second home appliance comprising a movable control panel is discussed in U.S. Patent Publication No. 2010-0206414, which is now issued as U.S. Pat. No. 8,726,791. According to the second home appliance, the control panel may be disposed near the upper end of the second home appliance and provided in a way that moves between a stop position and an exposure position. A storage container shaped into a water drawer may be disposed at the rear of the control panel, in the second home appliance. When the control panel is in the stop position, the storage container at the rear of the control panel may be covered by the control panel and not seen. The control panel can move in the up-down direction and move between the stop position and the exposure position. The control panel can move upward from the stop position to the exposure position. When the control panel is moved to the exposure position described above, the storage container can be exposed forward at the lower side of the control panel. When the storage container may be exposed forward as described above, it may be possible to access the storage container for charge of water.

According to the second home appliance, the control panel can move automatically. For example, the control panel can automatically move from the stop position to the exposure position and from the exposure position to the stop position. Like the control panel of the first home appliance, the control panel of the second home appliance moves upward and exposes the storage container forward. Thus, according to the second home appliance, in the process of withdrawing or inserting the tank, the tank may be not seen well, causing inconvenience to the user, and the user will generally need to bend such the user's eye level may be placed under the control panel.

According to the second home appliance, even though the control panel moves automatically, the user will perform a manual manipulation to hold and draw the storage container. However, since the process of drawing the storage container may be performed very close to the upper end of the door, the user may be burned due to heat discharged from the upper end of the door and an area around the upper end of the door in the process of drawing the storage container.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 1:
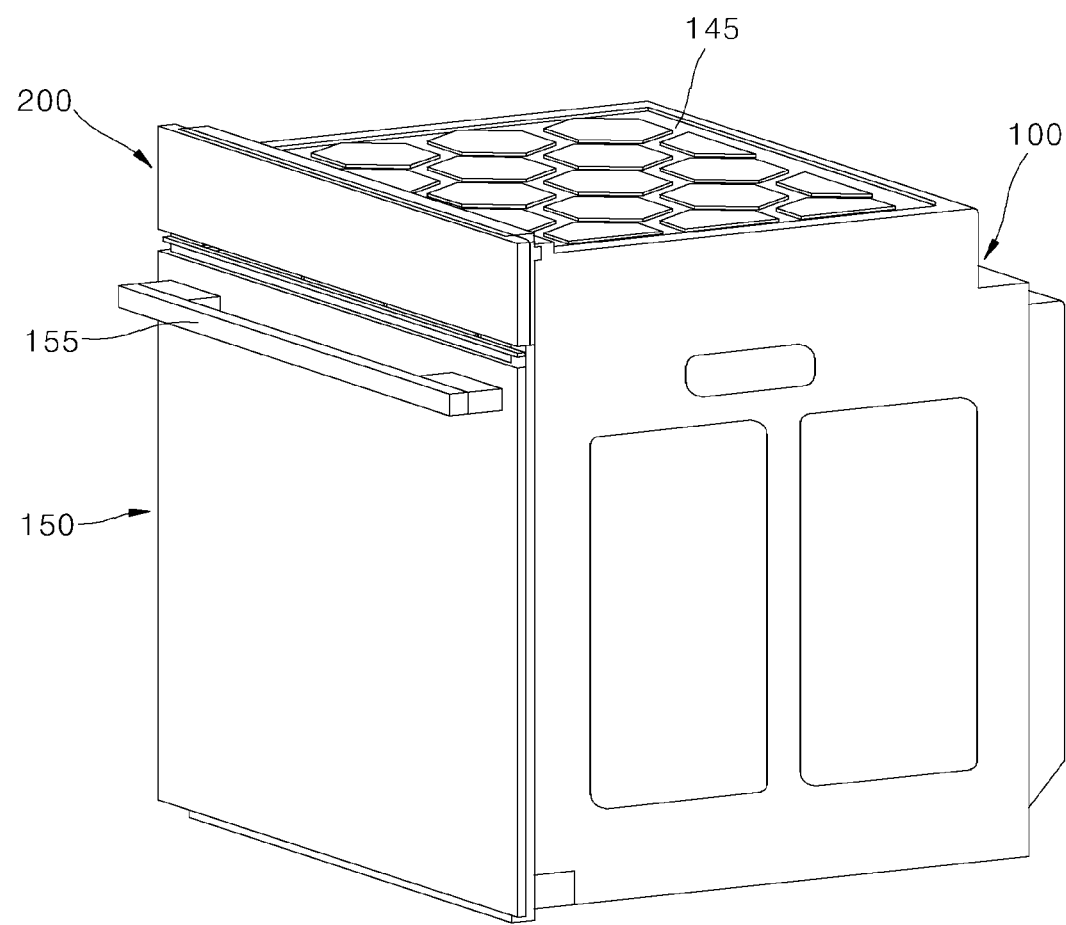
FIG. 1 is a perspective view showing a cooking appliance in one example.

The above-described aspects, features and advantages are specifically described hereafter with reference to accompanying drawings such that one having ordinary skill in the art to which the disclosure pertains can embody the technical spirit of the disclosure easily. In the disclosure, detailed description of known technologies in relation to the subject matter of the disclosure is omitted if it is deemed to make the gist of the disclosure unnecessarily vague Hereafter, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components are not to be limited by the terms. Certainly, a first component can be a second component, unless stated to the contrary.

Embodiments are not limited to the embodiments set forth herein, and can be modified and changed in various different forms. The embodiments in the disclosure are provided such that the disclosure can be through and complete and fully convey its scope to one having ordinary skill in the art. Accordingly, all modifications, equivalents or replacements as well as a replacement of the configuration of any one embodiment with the configuration of another embodiment or an addition of the configuration of any one embodiment to the configuration of another embodiment, within the technical spirit and scope of the disclosure, are to be included in the scope of the disclosure.

The accompanying drawings are provided for a better understanding of the embodiments set forth herein and are not intended to limit the technical spirit of the disclosure. It is to be understood that all the modifications, equivalents or replacements within the spirit and technical scope of the disclosure are included in the scope of the disclosure. The sizes or thicknesses of the components in the drawings are exaggerated or reduced to ensure ease of understanding and the like. However, the protection scope of the subject matter of the disclosure is not to be interpreted in a limited way.

The terms in the disclosure are used only to describe specific embodiments and not intended to limit the subject matter of the disclosure. In the disclosure, singular forms include plural forms as well, unless explicitly indicated otherwise. In the disclosure, the terms "comprise", "being comprised of" and the like specify the presence of stated features, integers, steps, operations, elements, components or combinations thereof but do not imply the exclusion of the presence or addition of one or more other features, integers, steps, operations, elements, components or combinations thereof. Similarly, the terms "first", "second" and the like are used herein only to distinguish one component from another component, and the components are not to be limited by the terms.

When any one component is described as being "connected" or "coupled" to another component, any one component can be directly connected or coupled to another component, but an additional component can be "interposed" between the two components or the two components can be "connected" or "coupled" by an additional component. When any one component is described as "being directly connected" or "being directly coupled" to another component, an additional component cannot be "interposed" between the two components or the two components cannot be "connected" or "coupled" by an additional component.

When any one component is described as being "on (or under)" another component, any one component can be directly on (or under) another component, and an additional component can be interposed between the two components.

Unless otherwise defined, all the terms including technical or scientific terms used herein have the same meaning as commonly understood by one having ordinary skill in the art. Additionally, terms such as those defined in commonly used dictionaries are to be interpreted as having a meaning that is consistent with their meaning in the context of the relevant art, and unless explicitly defined herein, are not to be interpreted in an ideal way or an overly formal way.

In the state where a cooking appliance stands on the floor, a direction in which a door is installed with respect to the center of the cooking appliance is defined as a forward direction. Accordingly, a direction toward the inside of the cooking appliance with the door open is defined as a rearward direction. For convenience, the forward direction and the rearward direction can be referred to as a first direction. Then the forward direction is referred to as one direction of the first direction, and the rearward direction is referred to as the other direction of the first direction.

Additionally, a gravitational direction can be defined as a downward direction, and a direction opposite to the gravitational direction can be defined as an upward direction.

Further, a horizontal direction across a front-rear direction of the cooking appliance, i.e., a widthwise direction of the cooking appliance that is seen in front of the door of the cooking appliance, can be referred to as a left-right direction. For convenience, the left-right direction can be referred to as a second direction. Then the right side can be referred to as one direction of the second direction, and the left side can be referred to as the other direction of the second direction. Further, the widthwise direction of the cooking appliance can also be referred to as a lateral direction. Then the right side can also be referred to as one side of the lateral direction, and the left side can be referred to the other side of the lateral direction.

Additionally, an up-down direction can be referred to as a third direction. Then an upward direction can be referred to as one direction of the third direction, and a downward direction can be referred to as the other direction of the third direction. Furthermore, the up-down direction can be referred to as a vertical direction. Then the front-rear direction and the left-right direction, i.e., the first direction and the second direction, can be referred to as a horizontal direction.

Throughout the disclosure, the terms "A and/or B" as used herein can denote A, B or A and B, and the terms "C to D" can denote C or greater and D or less, unless stated to the contrary.

[Entire Structure of Cooking Appliance]

Figure 2:
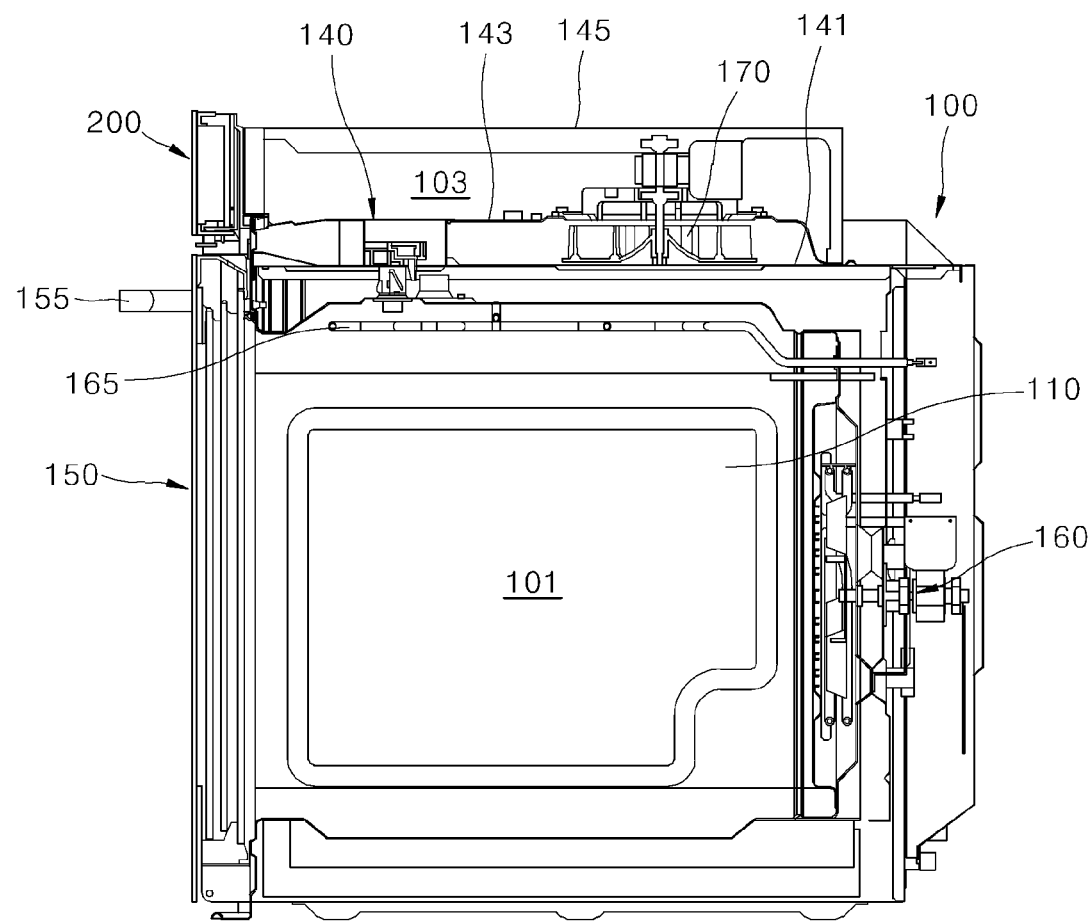
FIG. 2 is a lateral cross-sectional view showing that the inner structure of the cooking appliance in FIG. 1.
Figure 3:
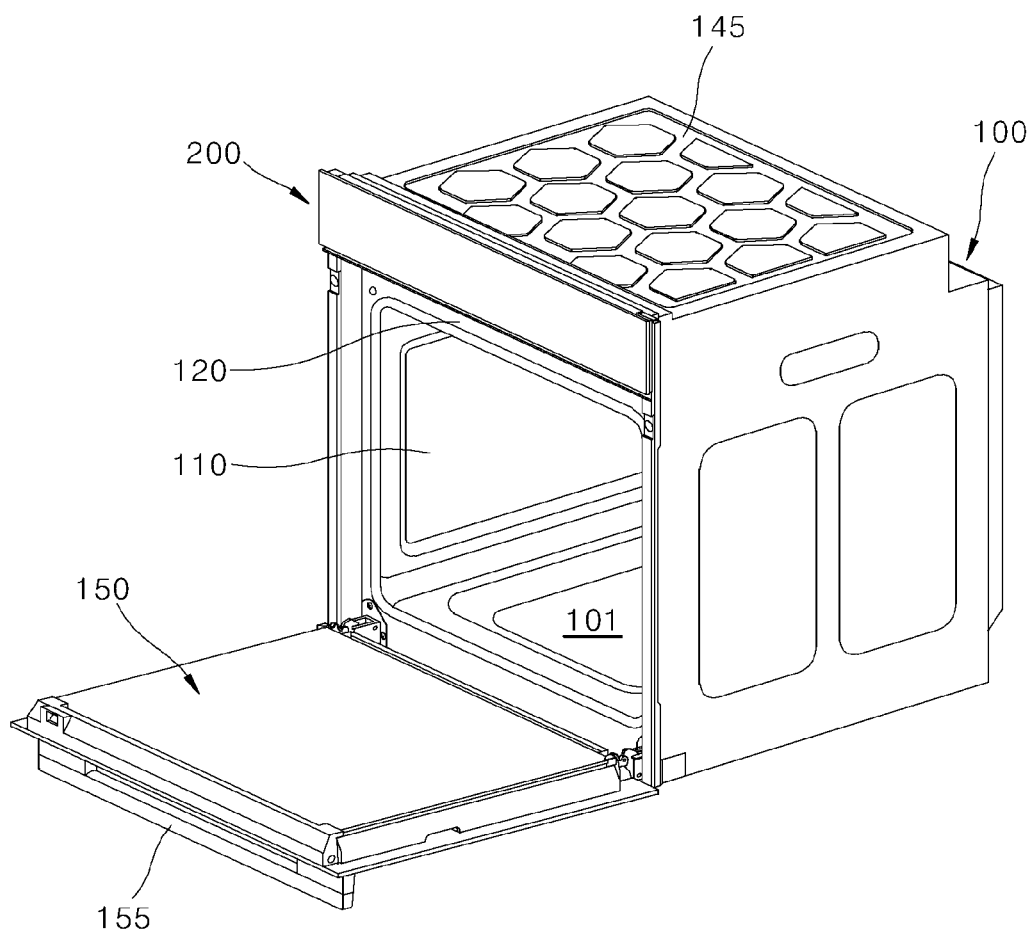
FIG. 3 is a perspective view showing that a cooking space of the cooking appliance in FIG. 1 is open.
Figure 4:
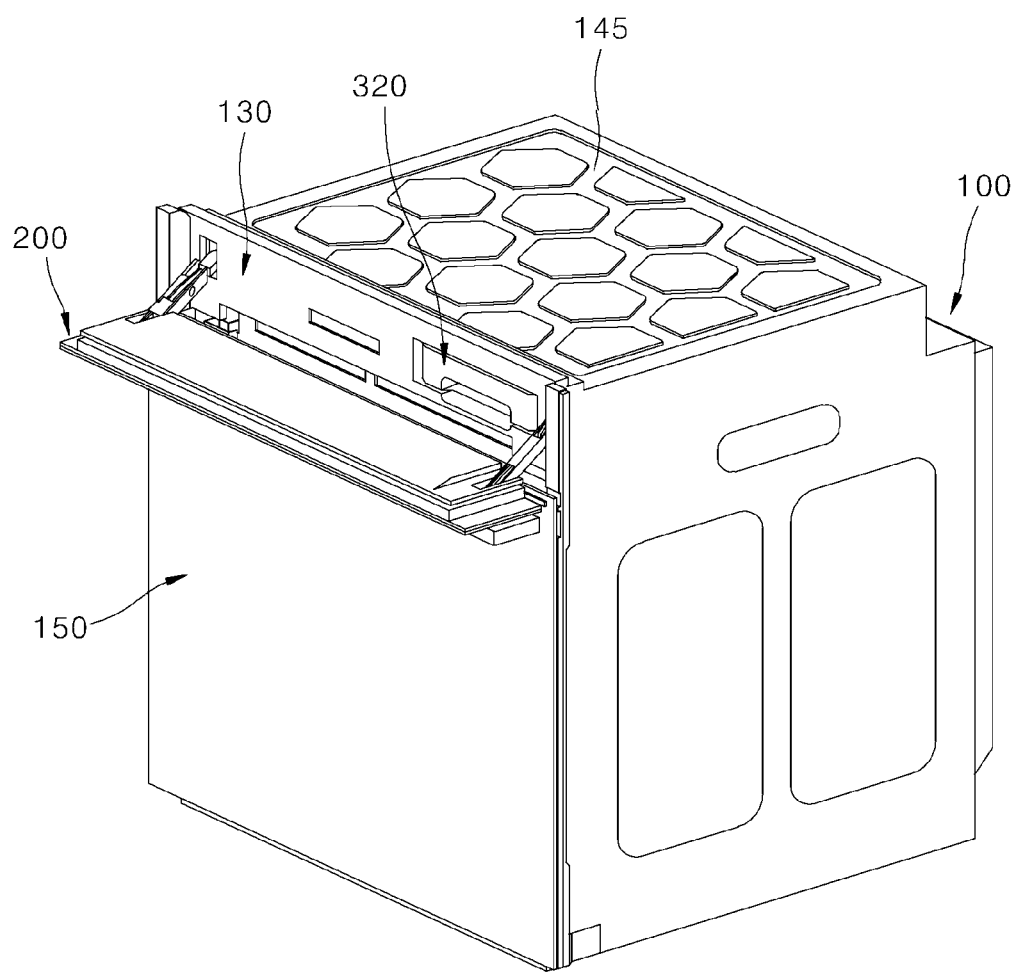
FIG. 4 is a perspective view showing that a control panel of the cooking appliance in FIG. 1 is open.

FIG. 1 is a perspective view showing a cooking appliance in one example, and FIG. 2 is a lateral cross-sectional view showing the inner structure of the cooking appliance in FIG. 1. FIG. 3 is a perspective view showing that a cooking space of the cooking appliance in FIG. 1 is open, and FIG. 4 is a perspective view showing that a control panel of the cooking appliance in FIG. 1 is open.

Referring to FIGS. 1 to 3, the exterior of the cooking appliance in one example may be formed by a main body 100. The main body 100 may have a shape comprising an approximate rectangle shape. The main body 100 may be made of a material of predetermined strength, to protect a plurality of parts that may be installed in the inner space of the main body 100.

The main body 100 may comprise a cavity (or cavity walls) 110. The cavity 110 may form the skeleton of the main body 100. The main body 100 may further comprise front panels 120, 130. A first front panel 120 may be provided as one of the front panels 120, 130. The first front panel 120 may be disposed between the cavity 110 and a door 150. The first front panel 120 may be disposed at the front of the cavity 110 and form the front surface of the main body 100.

In another example, the first front panel 120 may be not provided apart from the cavity 110, and the front surface of the cavity 110 may form the front surface of the main body 100. For example, the cavity 110 and the first front panel 120 may be integrally provided at the main body 100.

A cooking space 101 may be formed in the cavity 110. Additionally, an open part 126 (see FIG. 6) may be formed in the first front panel 120, and open the cooking space 101 forward. The cooking space 101 may have a cuboid shape with an open front surface. In when the cooking space 101 is closed, the cooking appliance heats the inner space of the cooking space 101 to cook a food item. For example, in the cooking appliance, a food item may be cooked in the inner space of the cooking space 101.

The cooking appliance may include a heating part (or heater) that heats the cooking space 101. As an example of the heating part, a convection part 160 may be provided at the rear of the cooking space 101, and perform convection of hot air and heat the inner space of the cooking space 101. For example, the convection part 160 may include a heating element to generate heat from burning fuel or electricity, and a fan to distribute the heat into the cooking space 101.

Additionally, an upper heater 165 or an upper burner may be provided as the heating part at the supper side of the cooking space 11 and heat the inner space of the cooking space 101 from above. Further, a lower heater or a lower burner may be provided as the heating part at the lower side of the cooking space 101 and heat the inner space of the cooking space 101 from below.

The door 150 may be swivably provided at the front of the main body 100 and open and close the cooking space 101 selectively. For example, the door 150 may open and close the cooking space 101 in a pull-down manner, i.e., in a way that the upper end of the door 150 swivels up and down around the lower end of the door 150.

The door 150 may be shaped into a cuboid that has a predetermined thickness entirely. Additionally, a handle 155 may be provided on the front surface of the door 150, such that the user grips the handle 150 when the user swivels the door 150.

The door 150 may include a see-through window. The see-through window may be made of a transparent material, e.g., glass, transparent plastics and the like. In the case of a cooking appliance to which a see-through window is applied, the see-through window resists high temperature and high pressure, and may further have a water resistant function to resist moisture from steam, a heat resistant function and the like.

An electronic component space 103 may be provided outside the cavity 110, such at an upper side of the cavity 110. In other examples, the electronic component space 103 may be provided at a side or below the cavity 110, or may be provided in a separate cabinet. The electronic component space 103 may be disposed at the upper sides of the cavity 110 and the cooking space 101 formed in the cavity 110. A space for installing electronic components may be formed in the electronic component space 103.

The front surface of the electronic component space 103 may be shielded by the front panels 120, 130. A second front panel 130 may be provided as one of the front panels 120, 130. The second front panel 130 may block the front of the electronic component space 103, and be disposed between the electronic component space 103 and the control panel 200. In an example, the second front panel 130 may be disposed at the upper side of the first front panel 120, and coupled to the first front panel 120.

The second front panel 130 may protrude to the upper portion of the cavity 110 and define the front boundary surface of the electronic component space 103. For example, all or most of the front of the electronic component space 103 may be blocked by the second front panel 130. Additionally, a portion of the front of the electronic component space 103, i.e., a portion of the lower side of the electronic component space 103, may be blocked by the first front panel 120.

Figure 6:
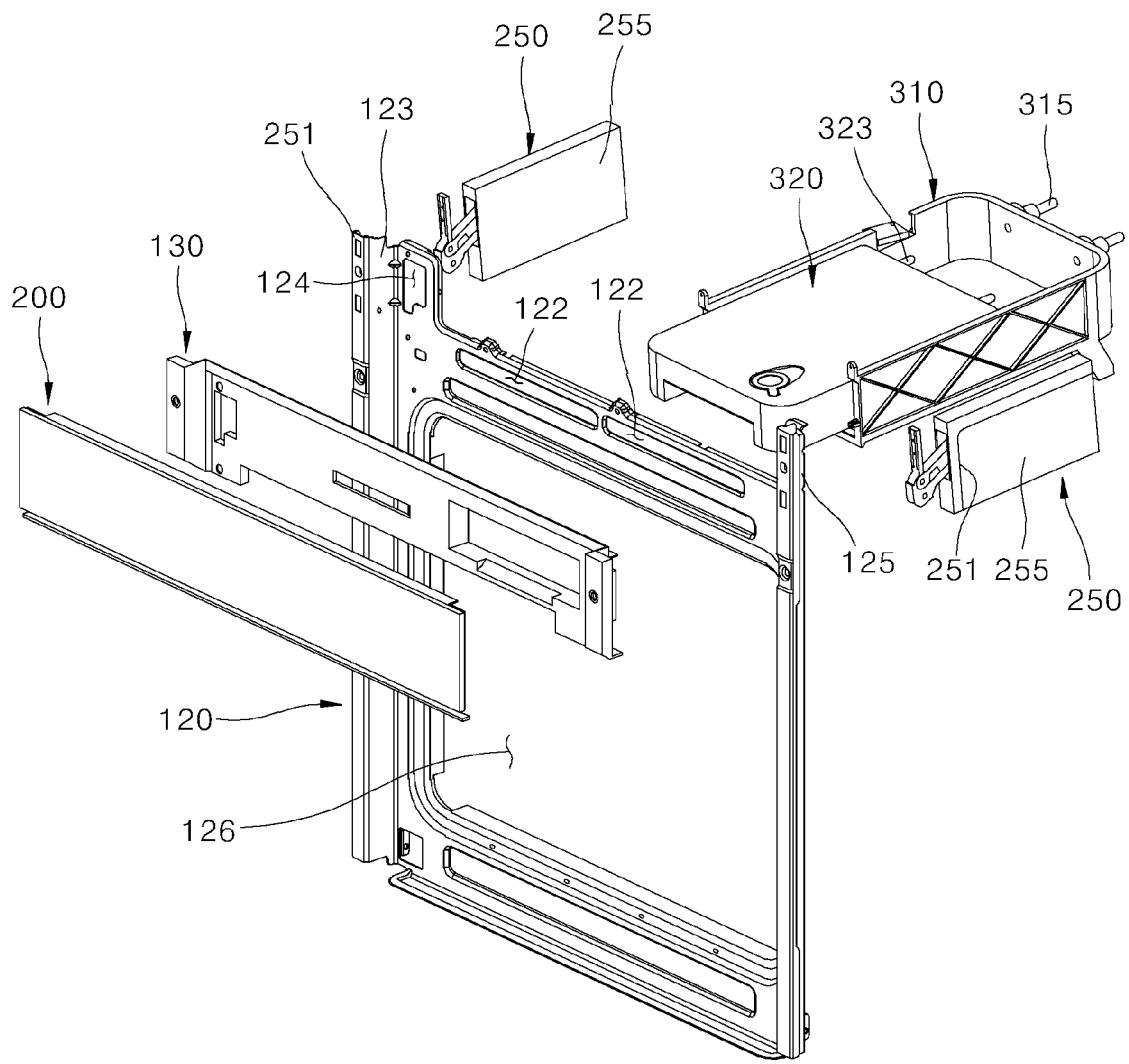
FIG. 6 is a front exploded perspective view separately showing a control panel and a water supply device of the cooking appliance in one example.

Further, the front panels 120, 130 may include an exhaust opening 122 (see FIG. 6). In the example, the exhaust opening 122 may be provided at the first front panel 120. The exhaust opening 122 may be formed in a way that penetrates the first front panel 120 in the front-rear direction. The exhaust opening 122 may form a passage enabling air in the electronic component space 103 to pass through the front panel 120 and be discharged out of the electronic component space 103, on the front panel 120.

In another example, the front panel 120 may be not provided apart from the cavity 110, and the front surface of the cavity 110 may form the front surface of the main body 100. At this example, the exhaust opening 122 may be provided on the front surface of the cavity 110 that has a shape corresponding to the shape of the front panel 120.

A control panel 200 may be provided in the upper portion of the front surface of the cooking appliance, i.e., on the front surface of the upper portion of the cavity 110. The control panel 200 may form a portion of the exterior of the front surface of the cooking appliance. A portion of the control panel 200 may be disposed at the front of the electronic component space 103. Additionally, a portion of the control panel 200 may be disposed at the front of the second front panel 130.

The control panel 200, as illustrated in FIGS. 3 and 4, may be provided to open and close in front of the electronic component space 103 or the second front panel 130. The control panel 200 may be provided to swivel between a closing position where the control panel 200 blocks the electronic component space 103 or the second front panel 130 and an opening position where the control panel 200 opens the electronic component space 103 or the second front panel 130 forward. The swivel structure of the control panel 200 is described below.

The control panel 200 may include a display part (or a display). The display part may comprise an input part (or input device) for adjusting the operation of the cooking appliance, and a display displaying information such as the operation state of the cooking appliance. In an example, the input part and the display may be formed by one panel. For example, the input part and the display may be formed into a touch panel that may be supplied with a touch input of the user. The display part may display a user interface (UI) or a graphical user interface (GUI) in relation to the operation of the cooking appliance. For example, a button for setting the operation of the heating part may be displayed on the display part. Additionally, a button for setting the opening and closing operation of the control panel 200 may be displayed on the display.

[Inner Structure of Electronic Component Space]

Figure 5:
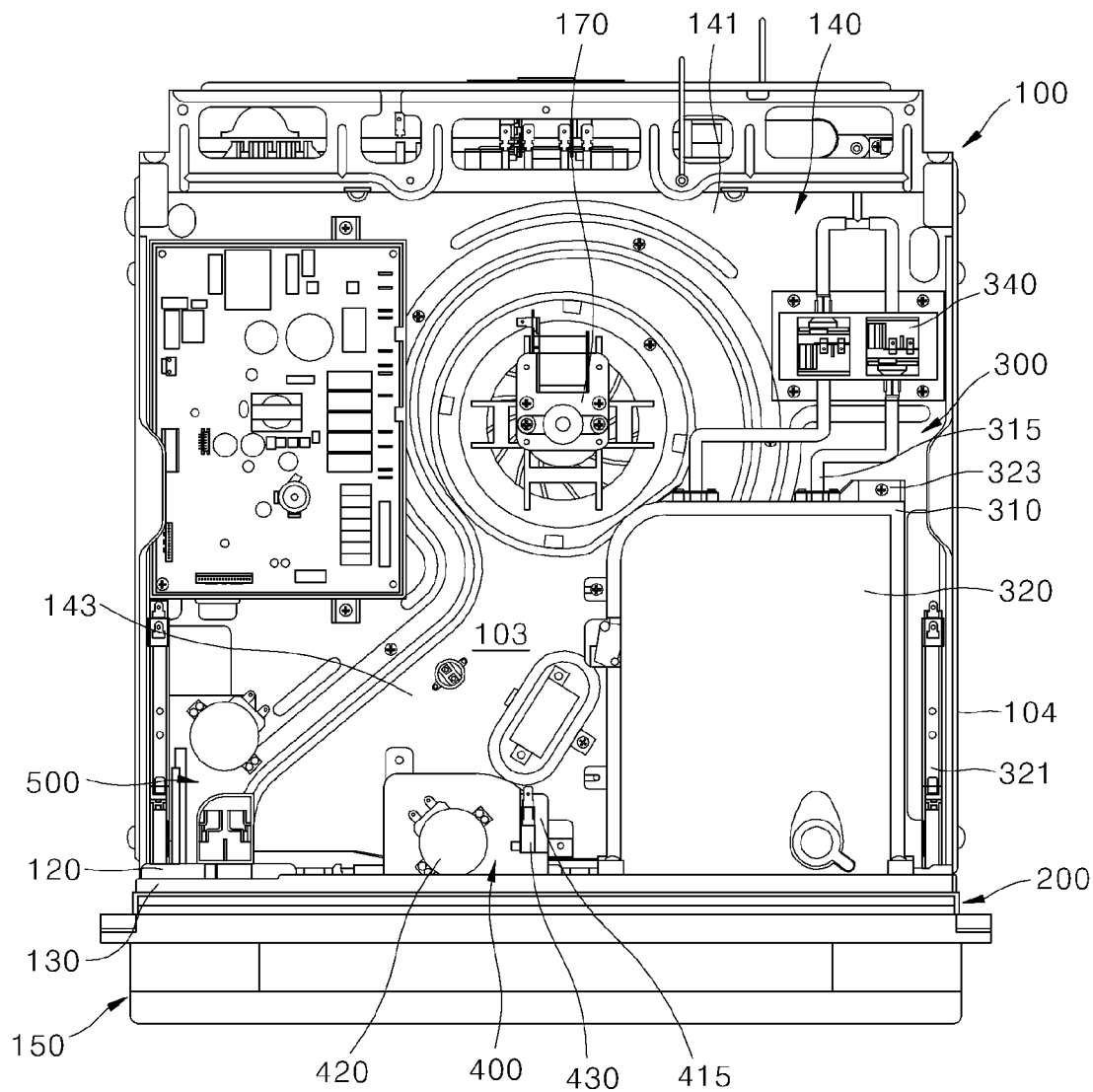
FIG. 5 is a plan view showing the inner structure of an electronic component space of the cooking appliance in FIG. 1.

FIG. 5 may be a plan view showing the inner structure of an electronic component space of the cooking appliance in FIG. 1. Referring to FIGS. 2 to 5, the lower boundary surface of the electronic component space 103 may be defined by an upper panel 140 that may be disposed at the upper side of the cavity 110. Additionally, the upper boundary surface of the electronic component space 103 may be defined by an electronic component space cover 145 that covers the electronic component space 103 from above.

Further, the electronic component space 103's lateral and rear boundary surfaces may be defined by lateral surfaces and a rear surface of the electronic component space cover 145 or may be defined by lateral surfaces of the cavity 110 protruding to the upper portion of the cooking space 101 and the rear surface of the electronic component space 145 protruding to the upper portion of the cooking space 101.

A vent hole may be formed on at least one of lateral surfaces or rear surface the electronic component space cover 145's, or lateral surfaces of the cavity 110'. Through the vent hole, external air may flow into the electronic component space 103.

Various types of electronic components may be disposed in the electronic component space 103. For example, a circuit board may be disposed in the electronic component space 103. The circuit board may include various types of elements, circuits and the like in relation to the receipt of a manipulation signal input through the control panel 200, the generation of a control signal for controlling the operation of the heating part, and the like.

The upper panel 140 may comprise a blocking panel part (or blocking panel region) 141 and a duct part (or duct region) 143. The blocking panel part 141 may be disposed to block of cover a region between the cavity 110 and the electronic component space 103. The blocking panel 141 may be disposed at the upper side of the cavity 110 and define the lower boundary surface of the electronic component space 103.

The duct part 143 may be formed to protrude upward from the blocking panel part 141. The duct part 143 may form a passage for discharging air in the electronic component space 103 out of the electronic component space 103 through the inside of the duct part 143. For example, the duct part 143 may form a passage allowing air suctioned by a fan module 170 described hereafter to flow to the exhaust opening 122.

The fan module 170 may be disposed in the electronic component space 103. The fan module 170 may be disposed relative closer to a side adjacent to the rear surface of the cavity 110, i.e., may be disposed in a position eccentric to the rear of the electronic component space 103, in the electronic component space 103. The fan module 170 may comprise a turbo fan or other type of fan installed in the electronic component space 103. The fan module 170 may suction external air through the rear of the electronic component space 103 and discharge the air to the front of the electronic component space 103.

Based on the operation of the fan module 170, external air may flow into the electronic component space 103 from the rear and sides of the cooking appliance. For example, external air drawn through the lower portion of the main body 100 may pass through the rear of the cooking appliance, and then flow into the electronic component space 103 through the vent hole formed at the rear of the electronic component space 103. Additionally, external air may also flow into the electronic component space 103 through the vent hole formed at the sides of the electronic component space 103.

The air flowing into the electronic component space 103 may cool the electronic components in the electronic component space 103 while moving forward in the electronic component space 103. For example, the air flowing into the electronic component space 103 may be suctioned into the duct part 143 by the fan module 170. The air flowing into the duct part 143 may move forward in the duct part 143, and then be discharged to the front of the electronic component space 103 through the exhaust opening 122.

As illustrated in FIG. 5, a water supply device 300 may be disposed in the electronic component space 103. The water supply device 300 may provide water to generate steam in a steam supply device. The steam supply device heats water to generate steam, such that steam generated by the steam supply device may be provided into the cooking space 101 through a steam nozzle.

[Structure of Water Supply Device]

Figure 7:
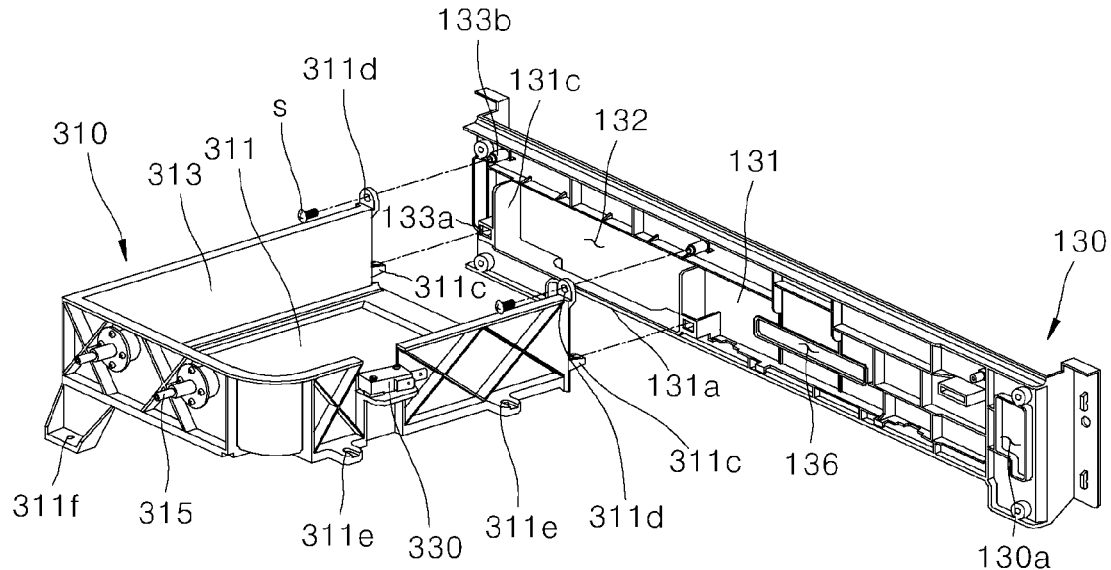
FIG. 7 is a rear exploded perspective view separately showing a second front panel and a housing in FIG. 5.
Figure 8:
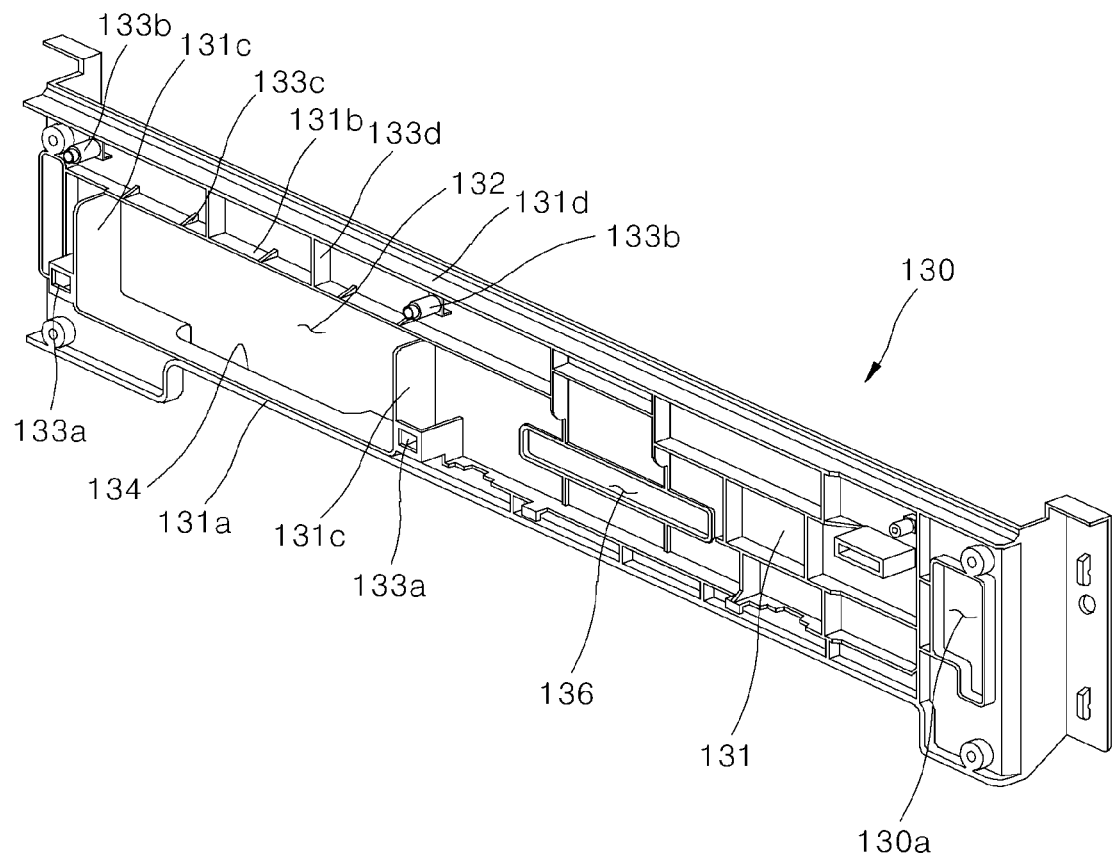
FIG. 8 is a rear perspective view separately showing the second front panel in FIG. 5.
Figure 9:
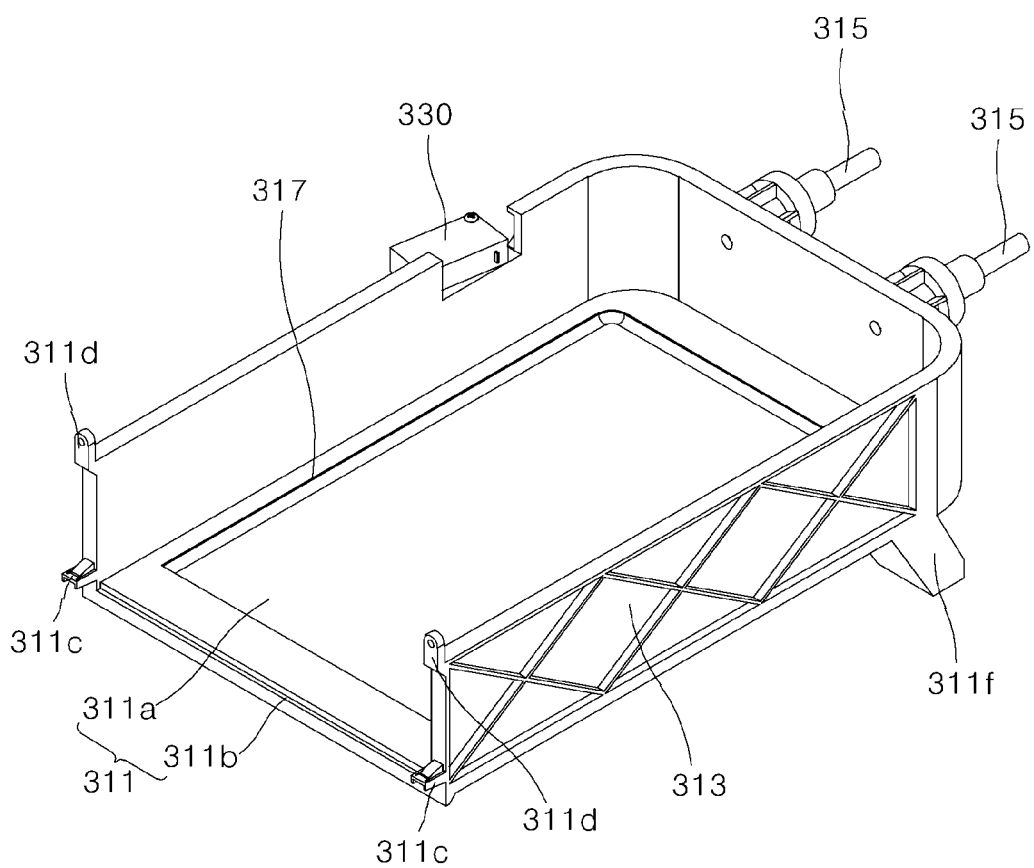
FIG. 9 is a front perspective view separately showing the housing in FIG. 5.
Figure 10:
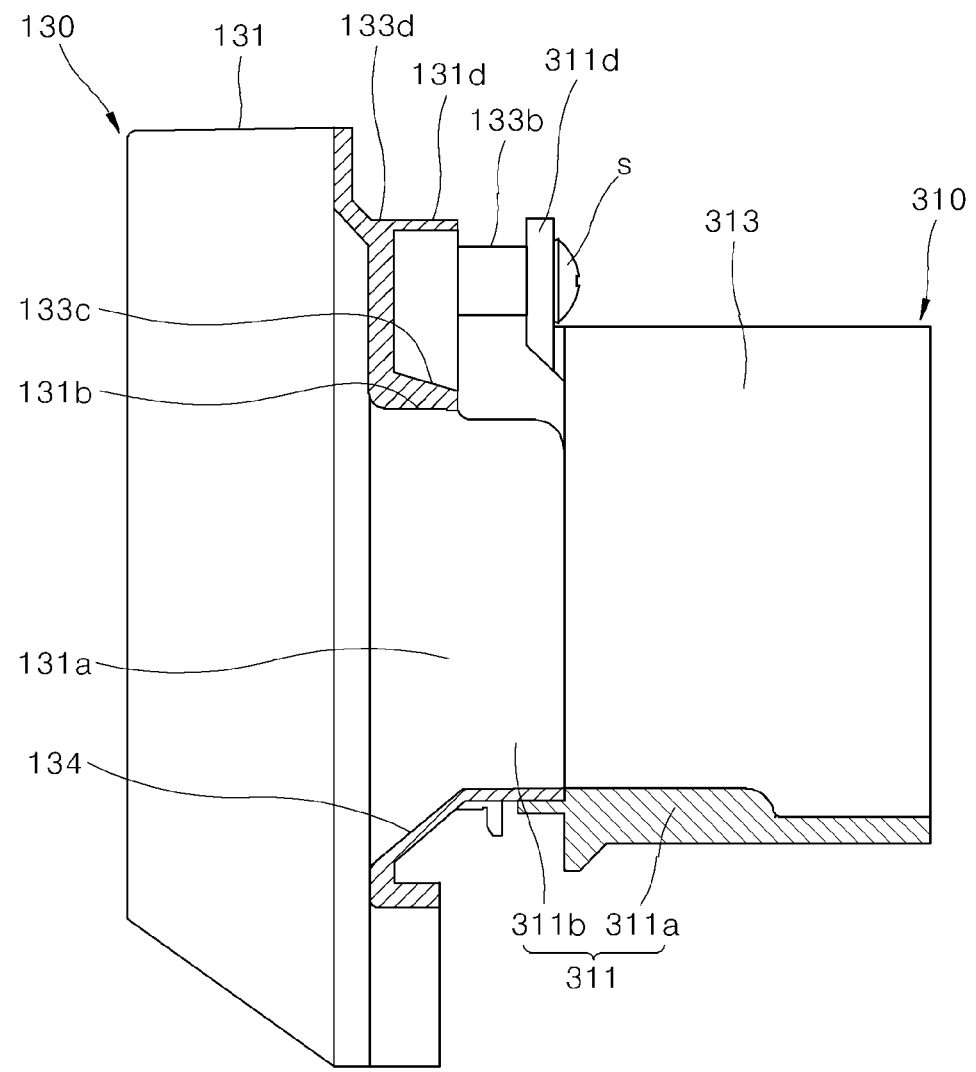
FIG. 10 is a lateral cross-sectional view showing a coupling structure between the second front panel and the housing in FIG. 5.
Figure 11:
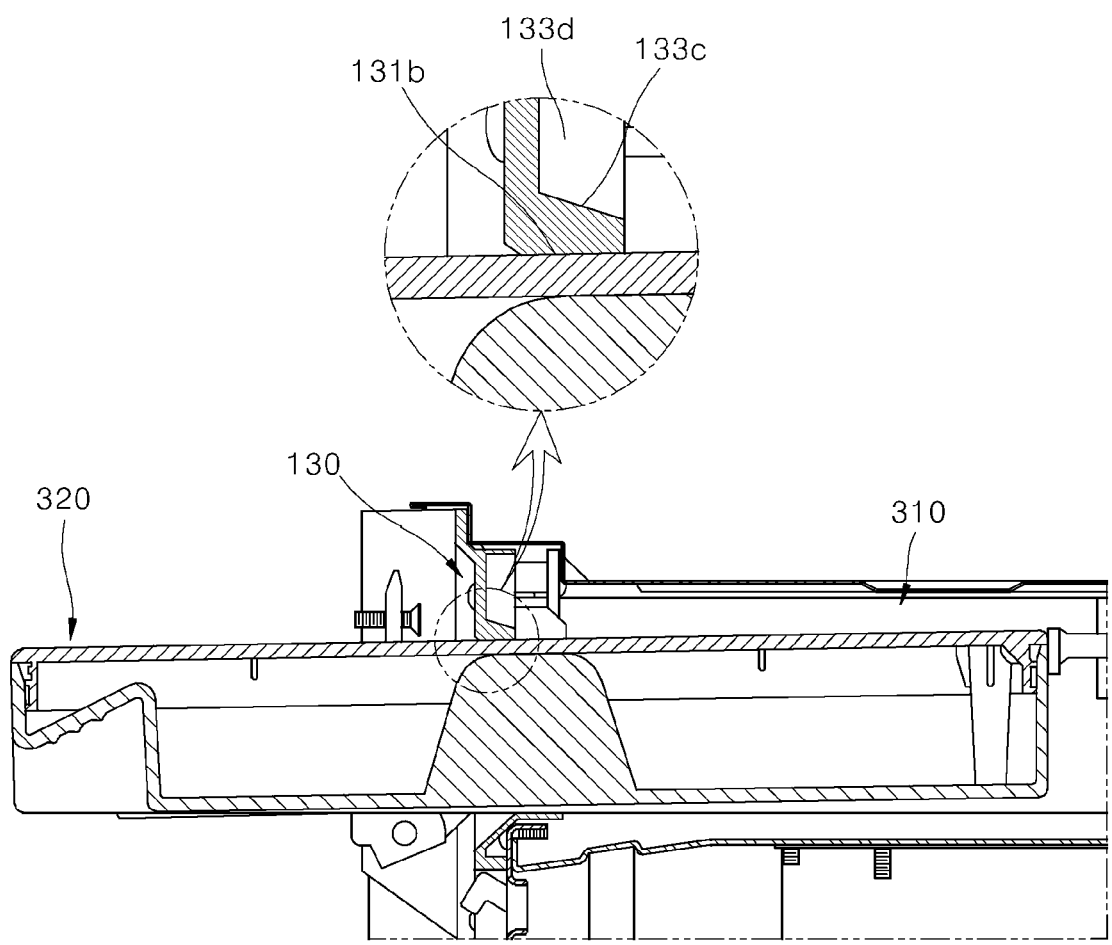
FIG. 11 is a lateral cross-sectional view showing a contact structure between the second front panel and a water tank in FIG. 5.

FIG. 6 is a front exploded perspective view separately showing a control panel and a water supply device of the cooking appliance in one example, and FIG. 7 is a rear exploded perspective view separately showing a second front panel and a housing in FIG. 5. Additionally, FIG. 8 is a rear perspective view separately showing the second front panel in FIG. 5, and FIG. 9 is a front perspective view separately showing the housing in FIG. 5. Further, FIG. 10 is a lateral cross-sectional view showing a coupling structure between the second front panel and the housing in FIG. 5, and FIG. 11 is a lateral cross-sectional view showing a contact structure between the second front panel and a water tank in FIG. 5.

Referring to FIGS. 5 to 7, the water supply device 300 may comprise a housing 310 and a water tank 320. The housing 310 may be fixed to the inside of the electronic component space 103, and the water tank 320 may be movably accommodated in the housing 310. In an example, the housing 310 may be disposed at the upper side of the upper panel 140. Additionally, the water tank 320 may be accommodated in the housing 310 in a way that the water tank 320 can move in the front-rear direction.

The water tank 320 may pass through one or more of the front panels 120, 130 in the electronic component space 103 and may be withdrawn from the front of the cooking appliance. For example, the water tank 320 may pass through the second front panel 130 in the electronic component space 103 and be withdrawn from the front of the cooking appliance. When the control panel 200 blocks the fronts of the electronic component space 103 and the second front panel 130, the water tank 320 may not be exposed and withdrawn forward. The water tank 320 may pass through the second front panel 130 and be withdrawn from the front of the cooking appliance only when the control panel 200 opens the electronic component space 103 and the second front panel 130 opens forward to expose the water tank 320.

The water tank 320 may accommodate water therein. The water tank 320 may include an injection opening. Water may be injected into the water tank 320 through the injection opening, and the injection opening may be opened and closed by a stopper 321.

Each of the water tank 320 and the housing 310 may include a nozzle 315, 323. The water accommodated in the water tank 320 may be discharged out of the water tank 320 through the nozzle 323 of the water tank 320. The nozzle 323 of the water tank 320 may connect to the nozzle 315 of the housing 310 when the water tank 320 was inserted into the housing 310.

The nozzle 315 of the housing 310 may connect to a pump 340 disposed at the rears of the water tank 320 and the housing 310, in the electronic component space 103. The pump 340 may connect to the water tank 320 through the nozzles 315, 323 and pump the water stored in the water tank 320. The pump 304 may supply the water accommodated in the water tank 320 to the steam supply device.

The water supply device 300 may further comprise a water tank sensing part (or water tank sensor) 330. The water tank sensing part 330 may sense the position of the water tank 320. For example, the water tank sensing part 330 may sense whether the water tank 320 was inserted into the housing 310 or whether the water tank 320 was withdrawn from the housing 310.

In the example, the water tank sensing part 330 comprises a microswitch, and the water tank sensing part 330 may be turned on (ON)/turned off (OFF) based on the movement of an actuator that protrudes on the microswitch. In an example, the water tank sensing part 330 may be disposed in the side portion of the housing 310. The actuator of the water tank sensing part 330 may be disposed in a way that the actuator protrudes to the inside of the housing 310 toward the water tank 320. For example, the water tank sensing part 330 may sense the position of the water tank 320 in a way that the water tank sensing part 330 may be turned on/off based on the movement of the water tank 320.

[Coupling Structure Between Second Front Panel and Housing]

The second front panel 130 may be disposed between the electronic component space 103 and the control panel 200. The second front panel 130 may be disposed to cover the front of the electronic component space 103.

The water tank 320 may be disposed at the rear of the second front panel 130. The second front panel 130 may include an access hole 132. The access hole 132 may be formed in a way that penetrates the second front panel 130 in the front-rear direction. The water tank 320 may pass through the second front panel 130 through the access hole 132.

The second front panel 130 may be disposed at the upper side of the first front panel 120, and coupled to the first front panel 120. The first front panel 120 may comprise protruding surface (or protrusions) parts 123, 125 that protrude upward from a lateral end of the first front panel 120, and the second front panel 130 may be coupled to the protruding surface parts 123, 125. The protruding surface parts 123, 125 may be respectively disposed at both sides of the first front panel 120 in the lateral direction thereof. For example, a pair of protruding surface parts 123, 125 may be spaced from each other in the lateral direction, with the open part 126 therebetween. Additionally, the second front panel 130 may be disposed between the pair of protruding surface parts 123, 125 and coupled to each of the pair of protruding surface parts 123, 125.

In an example, the first front panel 120 may be formed in a way that the upper ends of both sides of the first front panel 120 protrude upward, i.e., may have a "ㅂ" shape (e.g., an inverted A shape). The second front panel 130 may be disposed between the protruding upper ends of both sides of the first front panel 120. The end portions of both sides of the second front panel 130 may be respectively coupled to the protruding end portions of both sides of the first front panel 120.

Referring to FIGS. 5 to 8, the second front panel 130 may comprise a panel main body part 131. The panel main body part 131 may comprise a vertically planar surface that blocks the front of the electronic component space 103. In an example, the panel main body part 131 may have an approximate rectangle shape. The panel main body part 131 may be formed to have a vertically planar surface that extends in the lateral direction.

The second front panel 130 may include an access hole 132. The access hole 132 may be formed in a way that penetrates the panel main body part 131 in the front-rear direction. Additionally, a first inner wall part 131a, a second inner wall part 131b and a pair of third inner wall parts 131c may be provided around the access hole 132.

The first inner wall part 131a may be disposed at the lower side of the access hole 132, and the second inner wall part 131b may be disposed at the upper side of the access hole 132. Additionally, the third inner wall parts 131c may be disposed respectively in both lateral portions of the access hole 132. For example, the first inner wall part 131*a* may define the lower boundary surface of the access hole 132, and the second inner wall part 131*b* may define the upper boundary surface of the access hole 132. The third inner wall part 131*c* may define the lateral boundary surface of the access hole 132.

Further, the first inner wall part 131*a*, the second inner wall part 131*b*, and the third inner wall part 131*c* may respectively protrude rearward from the panel main body part 131. The first inner wall part 131*a*, the second inner wall part 131*b*, and the third inner wall part 131*c* may respectively comprise a planar surface that extends in the front-rear direction. For example, the first inner wall part 131*a* and the second inner wall part 131*b* may have a shape comprising a horizontally planar surface that extends in the front-rear direction. The third inner wall part 131*c* may have a shape comprising a vertically planar surface that extends in the front-rear direction.

The first inner wall part 131*a*, the second inner wall part 131*b*, and the third inner wall part 131*c* may be disposed on the path in which the water tank 320 moves. Accordingly, the inner surface of each of the first inner wall part 131*a*, the second inner wall part 131*b* and the third inner wall part 131*c*, which faces the outer surface of the water tank 320, may be shaped into a planar surface parallel with the outer surface of the water tank 320. For example, the first inner wall part 131*a*, the second inner wall part 131*b*, and the third inner wall part 131*c* may guide a movement and position of the water tank 320.

The housing 310 accommodating the water tank 320 may be disposed at the rear of the second front panel 130. The housing 310 may be disposed in the electronic component space 103, and coupled to the second front panel 130. The housing 310, as illustrated in FIGS. 7 to 9, may have an open front surface. The housing 310 may be coupled to the second front panel 130 in a way that the open front surface of the housing 310 connects to the access hole 132. Additionally, the housing 310 may have an upper surface that may be open. The housing 310 may be shaped into a cuboid the front surface and the upper surface of which may be approximately open, and comprise a bottom surface part 311, and a pair of lateral surface parts 313.

The bottom surface part 311 may form the bottom surface of the housing 310, and be disposed at the lower side of the water tank 320. Additionally, the lateral surface part 313 may form the lateral surface of the housing 310, and connect to the bottom surface part 311. The pair of lateral surface parts 313 may extend upward from the end portions of both sides of the bottom surface part 311, and each of the lateral surface parts 313 may be disposed in the lateral portion of the water tank 320.

Referring to FIGS. 7 to 10, the housing 310 and the second front panel 130 may be coupled while the front surface of the housing 310 contacts the rear surface of the second front panel 130. In the case where the housing 310 may be coupled to the second front panel 130, at least a portion of the bottom surface part 311 may overlap the second front panel 130 in the up-down direction.

In an example, the bottom surface part 311 may comprise a support surface 311*a* and an overlap surface 311*b*. The support surface 311*a* may be disposed at the lower side of the water tank 320, and may occupy most of the area of the bottom surface part 311. The overlap surface 311*b* may protrude forward from the support surface 311*a*.

At a time of coupling between the housing 310 and the second front panel 130, the overlap surface 311*b* may be disposed to protrude to the second front panel 130. At a time of coupling between the housing 310 and the second front panel 130, the overlap surface 311*b* may be disposed to overlap the bottom surface of the second front panel 130 in the up-down direction.

The housing 310 may be coupled to the second front panel 130 while the end portion of the front of the housing 310 contacts the rear surface of the second front panel 130. In an example, the housing 310 and the second front panel 130 may be coupled in the state where the end portions of the fronts of the bottom surface part 311 and the lateral surface parts 313 contact the end portions of the rears of the first inner wall part 131*a* and the third inner wall part 131*c*.

The overlap surface 311*b* may be disposed at the lower side of the support surface 311*a*, and a step may be formed between the overlap surface 311*b* and the support surface 311*a*. At a time of coupling between the housing 310 and the second front panel 130, the overlap surface 311*b* may be disposed at the lower side of the bottom surface of the second front panel 130.

In an example, the first inner wall part 131*a* may form a portion of the bottom surface of the second front panel 130. Accordingly, the first inner wall part 131*a* may form the bottom surface of the second front panel 130, in the lower area of the access hole 132. Thus, at a time of coupling between the housing 310 and the second front panel 130, the overlap surface 311*b* may be disposed at the lower side of the first inner wall part 131*a*, and closely contact the bottom surface of the first inner wall part 131*a*, i.e., the bottom surface of the second front panel 130.

When the overlap surface 311*b* contacts the bottom surface of the first inner wall part 131*a* closely as described above, the support surface 311*a* may connect to the first inner wall part 131*a* in the front-rear direction. For example, when the housing 310 and the second front panel 130 are coupled, the support surface 311*a* and the upper surface of the first inner wall part 131*a* may form a same, common planar surface. To this end, while a step may be formed between the overlap surface 311*b* and the support surface 311*a*, the step may have a height corresponding to the thickness of the first inner wall part 131*a*. Accordingly, the support surface 311*a* and the upper surface of the first inner wall part 131*a* may connect smoothly in the form of an identical planar surface.

The water tank 320 may slide the support surface 311*a* and the upper surface of the first inner wall part 131*a* and pass through the access hole 132. Additionally, the water tank 320 may pass though the access hole 132 while passing through a connection portion between the support surface 311*a* and the upper surface of the first inner wall part 131*a*. Since the support surface 311*a* and the upper surface of the first inner wall part 131*a* connect smoothly in the form of an identical planar surface, the water tank 320 may move smoothly through the access hole 132.

In an example, the support surface 311*a* and the first inner wall part 131*a* may connect to each other while the end portion of the front of the support surface 311*a* and the end portion of the rear of the first inner wall part 131*a* contact each other. The overlap surface 311*b* may wrap the connection portion between the support surface 311*a* and the first inner wall part 131*a* from below. For example, the overlap surface 311*b* may block a gap of the connection portion between the support surface 311*a* and the first inner wall part 131*a* from below.

The support surface 311*a* and the first inner wall part 131*a* may be a structure that may be disposed in the section where the water tank 320 moves and supports the water tank 320 from below. The water tank 320 accommodates water. In terms of the support surface 311a and the first inner wall part 131a that may be disposed in the section where the water tank 320 accommodating water moves, water may be likely to flow in the connection portion between the support surface 311a and the first inner wall part 131a.

If water flowing in the connection portion between the support surface 311a and the first inner wall part 131a flows downward through the gap between the support surface 311a and the first inner wall part 131a, the water may contaminate the inside of the electronic component space 103 or the perimeter of the upper end of the door. Additionally, the water may flow downward along the first front panel 120 and contaminate the perimeter of the lower side of the cooking appliance. In response to this concern, the gap may be blocked by the overlap surface 311b that wraps the connection portion between the support surface 311a and the first inner wall part 131a from below. Accordingly, the leakage of water through a gap between the second front panel 130 and the housing 310, and the contamination of the cooling appliance caused by the leakage of water may be prevented effectively.

Further, the overlap surface 311b may guide the position of the housing 310 relative to the second front panel 130, in the process where the second front panel 130 and the housing 310 may be coupled. For example, the position where the overlap surface 311b contacts the bottom surface of the first inner wall part 131a may be the up-down position of the housing 310 for coupling the housing 310 to the second front panel 130.

Further, the front-rear position of the housing 310 relative to the second front panel 130 may be guided by the support surface 311a. For example, the position where the end portion of the front of the support surface 311a contacts the end portion of the rear of the first inner wall part 131a may be the front-rear position of the housing 310 for coupling the housing 310 to the second front panel 130. For example, the front-rear position of the housing 310 for coupling the housing 310 to the second front panel 130 may be guided by the end portion of the front of the support surface 311a, contacting the end portion of the rear of the second inner wall part 131b, and the up-down position of the housing 310 for coupling the housing 310 to the second front panel 130 may be guided by the overlap surface 311b contacting the bottom surface of the first inner wall part 131a.

A first front coupling part 311c and a second front coupling part 311d may be provided on the lateral surface parts 313 of the housing 310. The first front coupling part 311c and the second front coupling part 311d may protrude forward from the end portion of the front of the lateral surface part 313. Additionally, the second front panel 130 may include a fitting coupling part 133a, and a fixing coupling part 133b. The fitting coupling part 133a and the fixing coupling part 133b may be provided on the rear surface of the second front panel 130 in a protruding manner.

In this example, the first front coupling part 311c and the second front coupling part 311d may be respectively provided on both of the lateral surface parts 313 of the housing 310. For example, the first front coupling part 311c and the second front coupling part 311d may be disposed on the left lateral surface part 313 of the housing 310 and spaced a predetermined distance apart from each other in the up-down direction, and the first front coupling part 311c and the second front coupling part 311d may also be disposed on the right lateral surface part 313 of the housing 310 and spaced a predetermined distance apart from each other in the up-down direction.

In response, the second front panel 130 may include a pair of fitting coupling parts 133a and a pair of fixing coupling parts 133b. The pair of fitting coupling parts 133a may be spaced from each other in the lateral direction, with the access hole 132 therebetween, and the pair of fixing coupling parts 133b may be spaced from each other materially with the access hole 132 therebetween. The fitting coupling part 133a and the fixing coupling part 133b may be spaced a predetermined distance apart from each other in the up-down direction.

Each of the first front coupling parts 311c may be coupled to each of the fitting coupling parts 133a, and each of the second front coupling parts 311d may be coupled to each of the fixing coupling parts 133b. The first front coupling part 311c may be fitted and coupled to the fitting coupling part 133a. Additionally, the second front coupling part 311d may be coupled to the fixing coupling part 133b by a fastening member s that fixes the second front coupling part 311d to the fixing coupling part 133b.

In an example, the first front coupling part 311c may be coupled to the fitting coupling part 133a, based on a hook-coupling method. To this end, the first front coupling part 311c may be shaped into a hook that has an elastically deformable projection in the lateral direction or in the up-down direction. The second front coupling part 311d may be provided as a structure having a fitting hole that may be open forward, and a holding jaw that surrounds the perimeter of the fitting hole.

The fitting coupling part 133a may be provided as a structure that protrudes upward from the end portion of the front of the lateral surface part 313. The fitting coupling part 133a may have a hollow hole that may be formed in a penetrating manner, in the front-rear direction. Additionally, the fixing coupling part 133b may be provided in the form of a boss that protrudes rearward from the rear surface of the second front panel 130. The fixing coupling part 133b may have a hollow hole that may be formed in a penetrating manner, in the front-rear direction. The fitting coupling part 133a and the fixing coupling part 133b may be coupled by a fastening member such as a screw and the like that penetrates the hollow holes of the fitting coupling part 133a and the fixing coupling part 133b.

The first front coupling part 311c may be coupled to the fitting coupling part 133a, based on a hook coupling method, and fitted and coupled to the second front panel 130. The second front coupling part 311d may be coupled to the second front panel 130 by a fastening member that fixes the second front coupling part 311d to the fixing coupling part 133b.

Coupling the housing 310 to the second front panel 130 may comprise fitting the first front coupling part 311c to the fitting coupling part 133a, temporarily fixing the housing 310 to the second front panel 130, and then fixing the second front coupling part 311d to the fixing coupling part 133b with a fastening member. In this example, a fitting and coupling process may be performed at a plurality of points along the lateral direction, and a fitting and coupling process and a fixing and coupling process may be performed together at a plurality of points along the up-down direction. Since the fitting and coupling process and the fixing and coupling process may be performed at a plurality of points as described above, the housing 310 and the second front panel 130 may be coupled reliably. As a result, the housing 310 and the second front panel 130 may be coupled easily and rapidly, and the housing 310 may be reliably fixed in an accurate position, relative to the second front panel 130.

Referring to FIGS. 8 and 11, the second front panel 130 may include a reinforcement rib 133c. The reinforcement rib 133c may be disposed near the second inner wall part 131b that may be disposed at the upper side of the access hole 132. The reinforcement rib 133c may protrude from the upper surface of the second inner wall part 131b. The reinforcement rib 133c may be disposed to overlap the access hole 132 in the up-down direction.

The second front panel 130 may include a plurality of reinforcement ribs 133c. For example, the plurality of reinforcement ribs 133c may be disposed on the upper surface of the second inner wall part 131b along the lateral direction. The plurality of reinforcement ribs 133c that protrudes from the second inner wall part 131b as described above may improve the strength of the second inner wall part 131c.

As described above, the first inner wall part 131a and the second inner wall part 131b may be disposed on the path in which the water tank 320 moves. The first inner wall part 131a may support the water tank 320 passing through the access hole 132 from below, and the second inner wall part 131b may be disposed at the upper side of the water tank 320 passing through the access hole 132. When the water tank 320 is filled with water, a significant load may be applied to the first inner wall part 131a. The load applied to the first inner wall part 131a may act as a force of making the second inner wall part 131b hang down. In one example, the first inner wall part 131a may be coupled to the bottom surface of the housing 310. Additionally, the bottom surface of the first inner wall part 131a may be supported by the overlap surface 311b that may be disposed at the lower side of the first inner wall part 131a. For example, the first inner wall part 131a may be supported by the housing 310 that may be coupled to the first inner wall part 131a, and resists the load applied by the water tank 320 effectively.

In the case where the shape of the first inner wall part 131a may be deformed due to the load applied to the first inner wall part 131a, the deformation of the first inner wall part 131a may affect the second inner wall part 131b. For example, in the case where the first inner wall part 131a sags, the second inner wall part 131b connecting with the first inner wall part 131a hangs downward together with the first inner wall part. When the second inner wall part 131b hangs downward, the second inner wall part 131b presses the water tank 320 downward, and the water tank 320 may tilt, causing an increase in the friction between the second inner wall part 131b and the water tank 320 and preventing the water tank 320 from moving smoothly. Also, when the second inner wall part 131b hangs downward, aesthetic qualities of the exterior of the cooking appliance deteriorate, and the friction between the second inner wall part 131b and the water tank 320 increases, causing noise at a time of moving the water tank 320.

Unlike the first inner wall part 131a, the second inner wall part 131b may be not coupled to the housing 310. In the case where an external force may be applied downward to the second inner wall part 131b, the second inner wall part 131b may be deformed more easily than the first inner wall part 131a.

Considering this deformation of the first inner wall part 131a and the second inner wall part 131b, a plurality of reinforcement ribs 133c may be formed on the upper surface of the second inner wall part 131b. The reinforcement ribs 133c may support the second inner wall part 131b to prevent the second inner wall part 131b from hanging downward easily. For example, the first inner wall part 131a may be supported by the housing 310 coupled to the first inner wall part 131a, to resist a load applied by the water tank 320 effectively. When the load resistance of the first inner wall part 131a increases as described above, the second inner wall part 131b may be less affected by a load applied to the first inner wall part 131a. Further, since the second inner wall part 131b may be supported by the reinforcement ribs 133c, the second inner wall part 131b may resist a force applied to the second inner wall part 131b effectively.

An interaction between the force of supporting the first inner wall part 131a and the force of supporting the second inner wall part 131b may lead to effective support of the second inner wall part 131b such that the second inner wall part 131b may be prevented from sagging. Thus, the cooking appliance in the example may effectively suppress the sag of the second inner wall part 131b, the inclination of the water tank 320 caused by the sag of the second inner wall part, the failure in the withdrawal/insertion of the water tank 320, the deterioration in the exterior of the cooking appliance, an increase in noise, and the like.

The second front panel 130 may further comprise an outer wall part 131d. The outer wall part 131d may be disposed at the upper side of the second inner wall part 131b. The outer wall part 131d may protrude rearward from the panel main body 131, like the second inner wall part 131b.

Further, the second front panel 130 may further comprise a connection rib 133d. The connection rib 133d may protrude rearward from the panel main body 131. The connection rib 133d may be provided to connect between the outer wall part 131d and the second inner wall part 131b. The connection rib 133d may connect the second inner wall part 131b with the outer wall part 131d, and improve the strength of the second inner wall part 131b. The connection rib 133d may improve the strength of the panel main body part 131.

[Disposition Relationship Between Duct Part and Water Supply Device]

Figure 12:
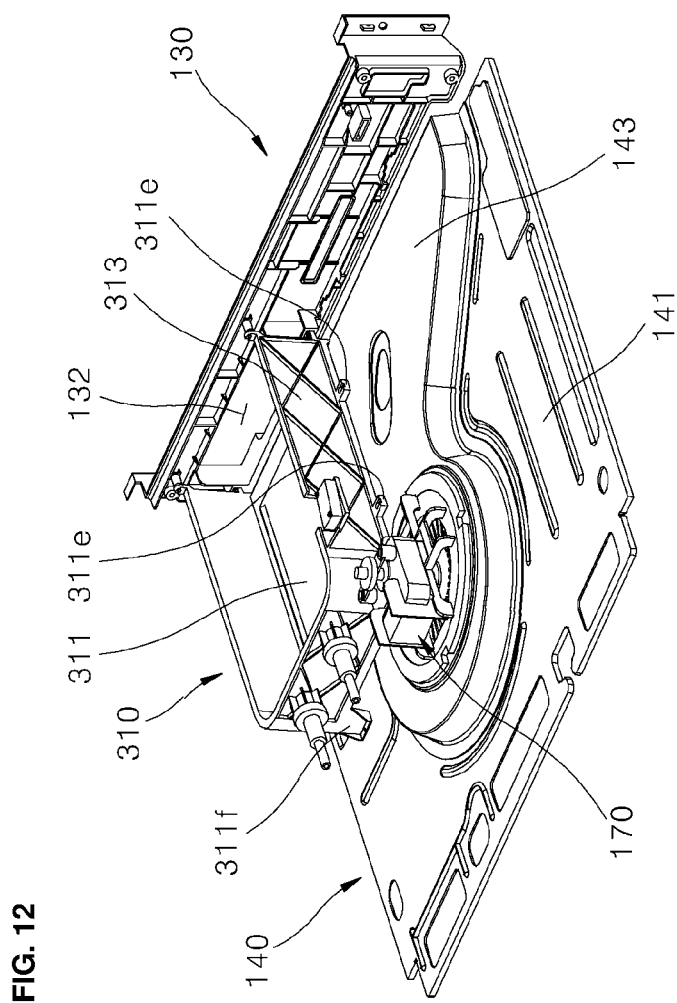
FIG. 12 is a perspective view separately showing an upper panel and a housing of a cooking appliance in one example.
Figure 13:
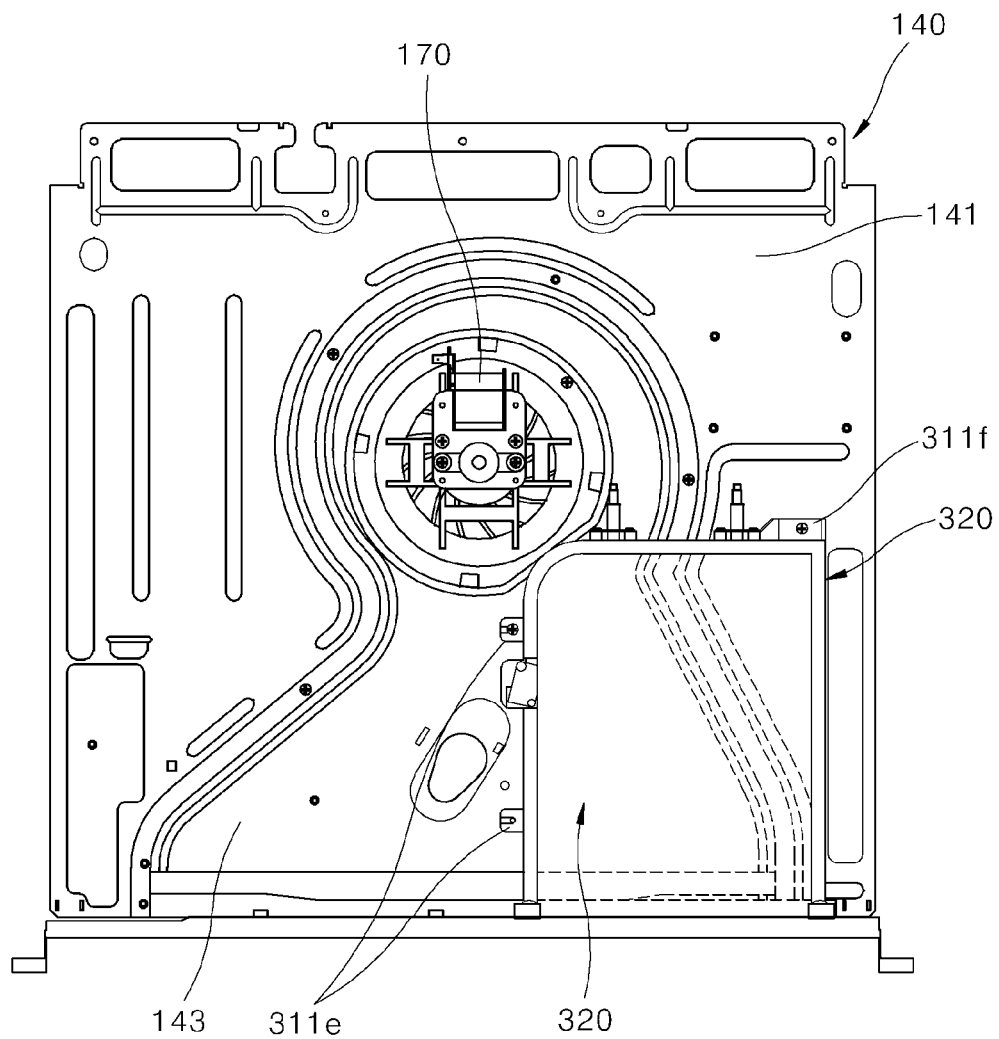
FIG. 13 is a plan view showing a coupling state between the upper panel and the housing in FIG. 11.
Figure 14:
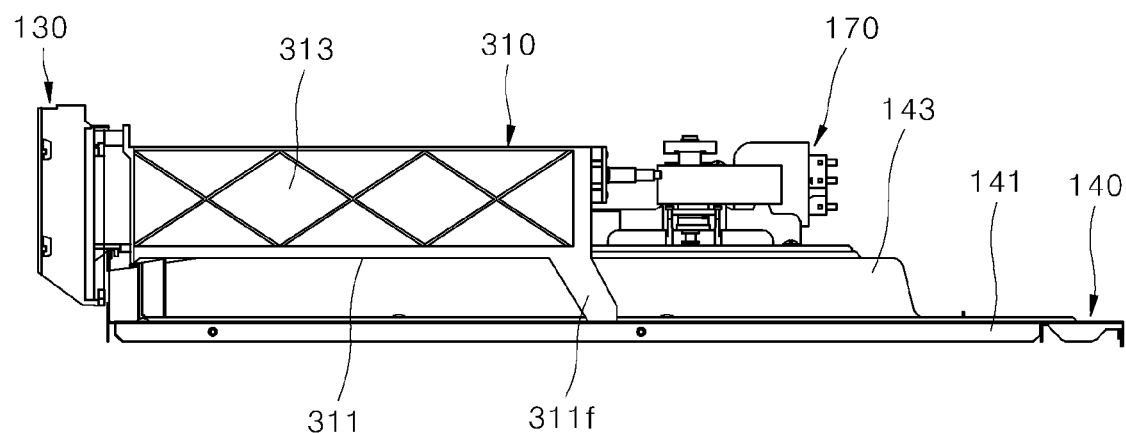
FIG. 14 is a side view showing a coupling state between the upper panel and the housing in FIG. 11.

FIG. 12 is a perspective view separately showing an upper panel and a housing of a cooking appliance in one example, FIG. 13 is a plan view showing a coupling state between the upper panel and the housing in FIG. 11, and FIG. 14 is a side view showing a coupling state between the upper panel and the housing in FIG. 11.

Referring to FIGS. 5 and 12 to 14, the upper panel 140 may be disposed at the upper side of the cavity 110, and the housing 310 may be disposed at the upper side of the upper panel 140. In this example, at least a portion of the housing 310 may be disposed to overlap a duct part 143 in the up-down direction. For example, at least a portion of the housing 310 may be disposed in the upper area of the duct part 143.

In one example, the housing 310 may be shaped into an approximate cuboid, for example. The bottom surface of the housing 310 may be shaped into a horizontally planar surface parallel with a planar surface that may be formed by the blocking panel part 141 of the upper panel 140 approximately. Accordingly, when at least a portion of the housing 310, as described above, was disposed in the upper area of the duct part 143, most of the area of the housing 310 may be spaced from the blocking panel part 141 in the up-down direction. In this example, the entire area of the housing 310 may be spaced upward from the blocking panel part 141.

A partial area of the housing 310, disposed in the upper area of the duct part 143, may be mounted on the upper surface of the duct part 143. For example, the housing 310 may be spaced upward from the blocking panel part 141 by a difference in the heights of the blocking panel part 141 and the duct part 143 and mounted on the upper surface of the duct part 143.

The water supply device 300 may further comprise a first downward coupling part (or first downward coupler) 311e and a second downward coupling part (or second downward coupler) 311f. The first downward coupling part 311e may be disposed in an area that may be in the upper portion of the duct part 132, out of the two areas of the housing 310. The second downward coupling part 311f may be disposed in an area that may be in the upper portion of the blocking panel part 141, out of the two areas of the housing 310.

The first downward coupling part 311e may protrude from the housing 310 toward the duct part 143. For example, the first downward coupling part 311e may protrude in the lateral direction from an edge that connects between the bottom surface part 311 and the lateral surface part 313. The first downward coupling part 311e may be coupled to the duct part 143, at the upper side of the duct part 143.

Based on the coupling between the first downward coupling part 311e and the duct part 143, the housing 310 may be coupled to the duct part 143. A plurality of the first downward coupling parts 311e may be provided in the front-rear direction. Accordingly, the housing 310 and the duct part 143 may be coupled at a plurality of points, in the front-rear direction.

The second downward coupling part 311f may protrude from the housing 310 toward the blocking panel part 141. For example, the second downward coupling part 311f may protrude downward from an edge that connects between the bottom surface part 311 and the lateral surface part 313. The second downward coupling part 311f may be coupled to the blocking panel part 141, at the upper side of the blocking panel part 141. Based on the coupling between the second downward coupling part 311f and the blocking panel part 141, the housing 310 may be coupled to the blocking panel part 141. At this time, the second downward coupling part 311f may protrude downward from the housing 310 by a length that corresponds to a difference in the heights of the blocking panel part 141 and the duct part 143.

In one example, the duct part 143 may be disposed approximately at the center in the electronic component space 103 in the lateral direction. The housing 310 may be eccentric to one side in the electronic component space 103 in the lateral direction. Accordingly, the first downward coupling part 311e coupled to the duct part 143, and the second downward coupling part 311f coupled to the blocking panel part 141 may be spaced from each other in the lateral direction. For example, one side of the housing 310 in the lateral direction may be coupled to the duct part 143 by the first downward coupling part 311e, and the other side of the housing 310 in the lateral direction may be coupled to the blocking panel part 141 by the second downward coupling part 311f.

Additionally, the second downward coupling part 311f may be eccentric to the rear of the housing 310. For example, the second downward coupling part 311f may protrude from the end portion of the rear of the housing 310. Accordingly, the front of the housing 310 may be coupled to the second front panel 130, one side of the housing 310 in the lateral direction may be coupled to the duct part 143 by the first downward coupling part 311e, and the other side of the housing 310 in the lateral direction may be coupled to the blocking panel part 141 by the second downward coupling part 311f. Further, the rear of the housing may be coupled to the upper panel 140 by the first downward coupling part 311e and the second downward coupling part 311f.

The housing 310, as described above, may be coupled to the second front panel 130 and the upper panel 140 at a plurality of points comprising points at both sides in the front-rear direction and points at both sides in the lateral direction, and reliably fixed to the inside of the electronic component space 103. In relation to the housing 310 installed as described above, a partial area of the housing 310 may contact the duct part 143, and the remaining area of the housing 310 may be spaced from the blocking panel part 141. The duct part 143 may remain cold with the help of cold air flowing in the duct part 143. Accordingly, a partial area of the housing 310, contacting the duct part 143, may be cooled by the duct part 143.

Since the remaining area of the housing 310 may be spaced from the blocking panel part 141, the remaining area of the housing 310 may be less affected by the blocking panel part 141 and the temperature of which may remain relatively higher than the duct part 143. For example, the remaining area of the housing 310 may remain spaced from the blocking panel part 141, and avoid the effect of heat transferred from the blocking panel part 141.

Further, a space between the remaining area and the blocking panel part 141 may form an air passage in the lower area of the housing 310. External air may flow into the electronic component space 103 through the vent hole disposed in the lateral direction of the electronic component space 103, and the drawn external air may cool the housing 310 while passing through the lower area of the housing 310. As described above, the housing 310 in the example may be cooled by an external air passing through the lower area of the housing 310, at the same time as the housing 310 may be cooled by the duct part 143. Accordingly, the thermal resistance of the housing 310 may improve without causing an increase in the manufacturing costs of the housing 310, and materials for the housing 310 may be freely selected.

[Water Tank and Surrounding Structure Thereof]

Figure 15:
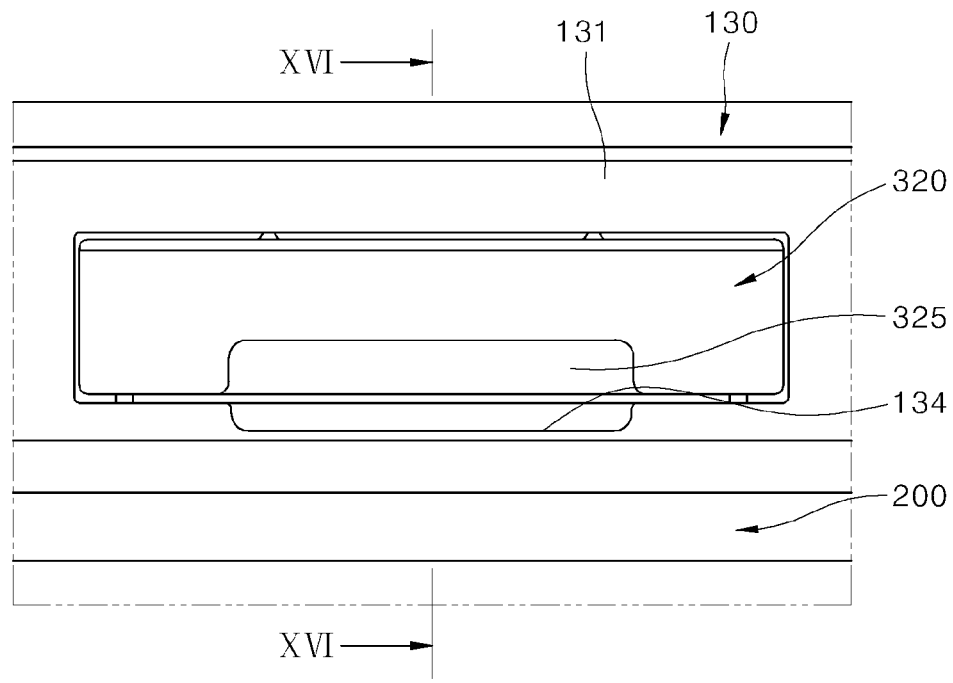
FIG. 15 is an enlarged front view showing the front surface of a water tank that is exposed to the front of a cooking appliance in one example.
Figure 16:
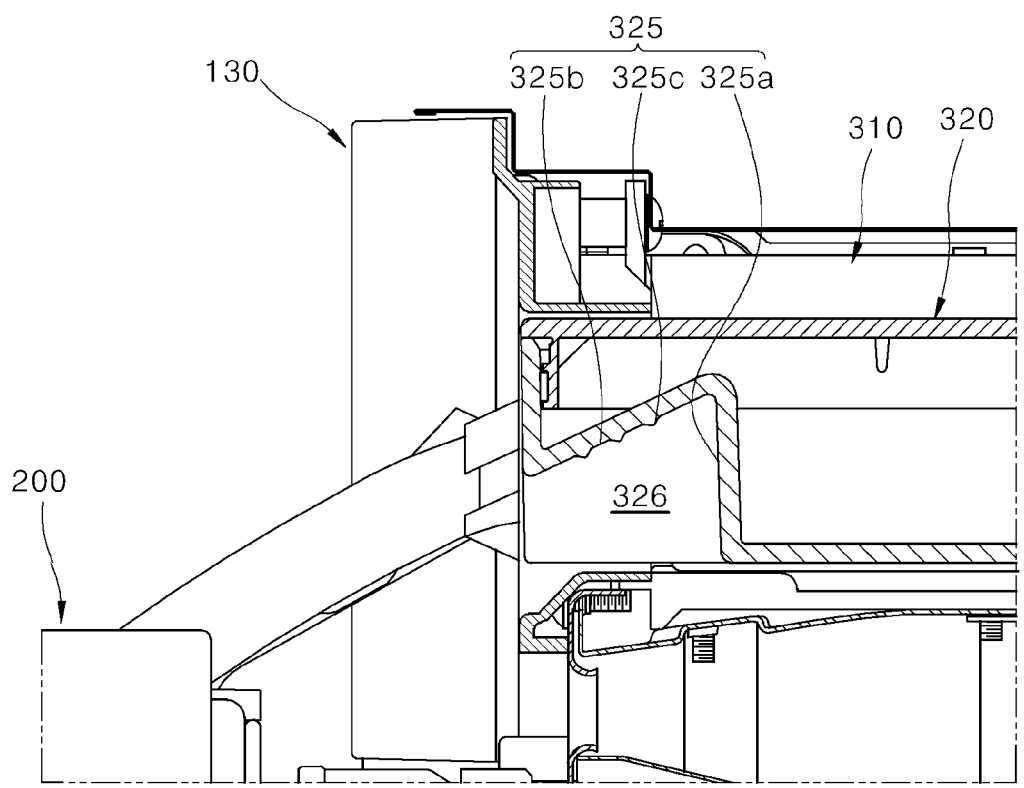
FIG. 16 is a cross-sectional view along line ""XVI-XVI" in FIG. 15.
Figure 17:
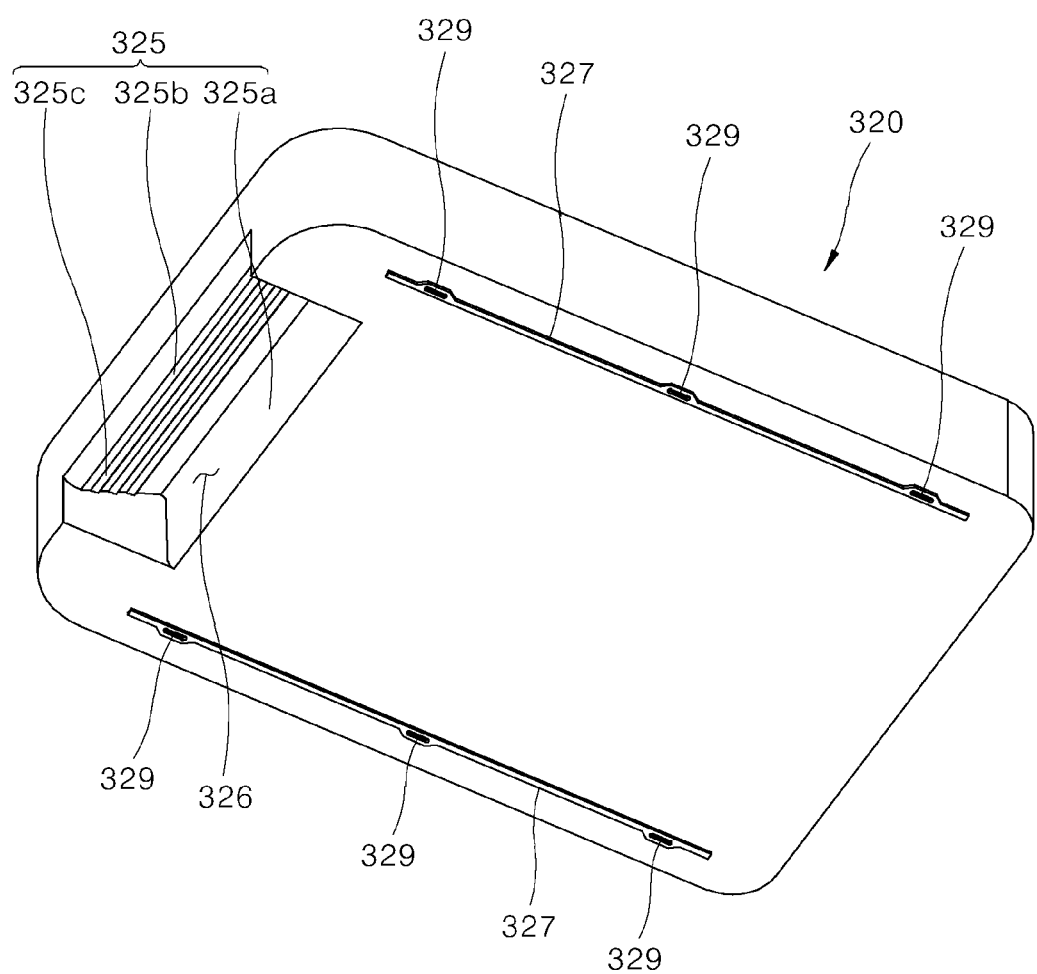
FIG. 17 is a bottom perspective view separately showing a water tank of a cooking appliance in one example.
Figure 18:
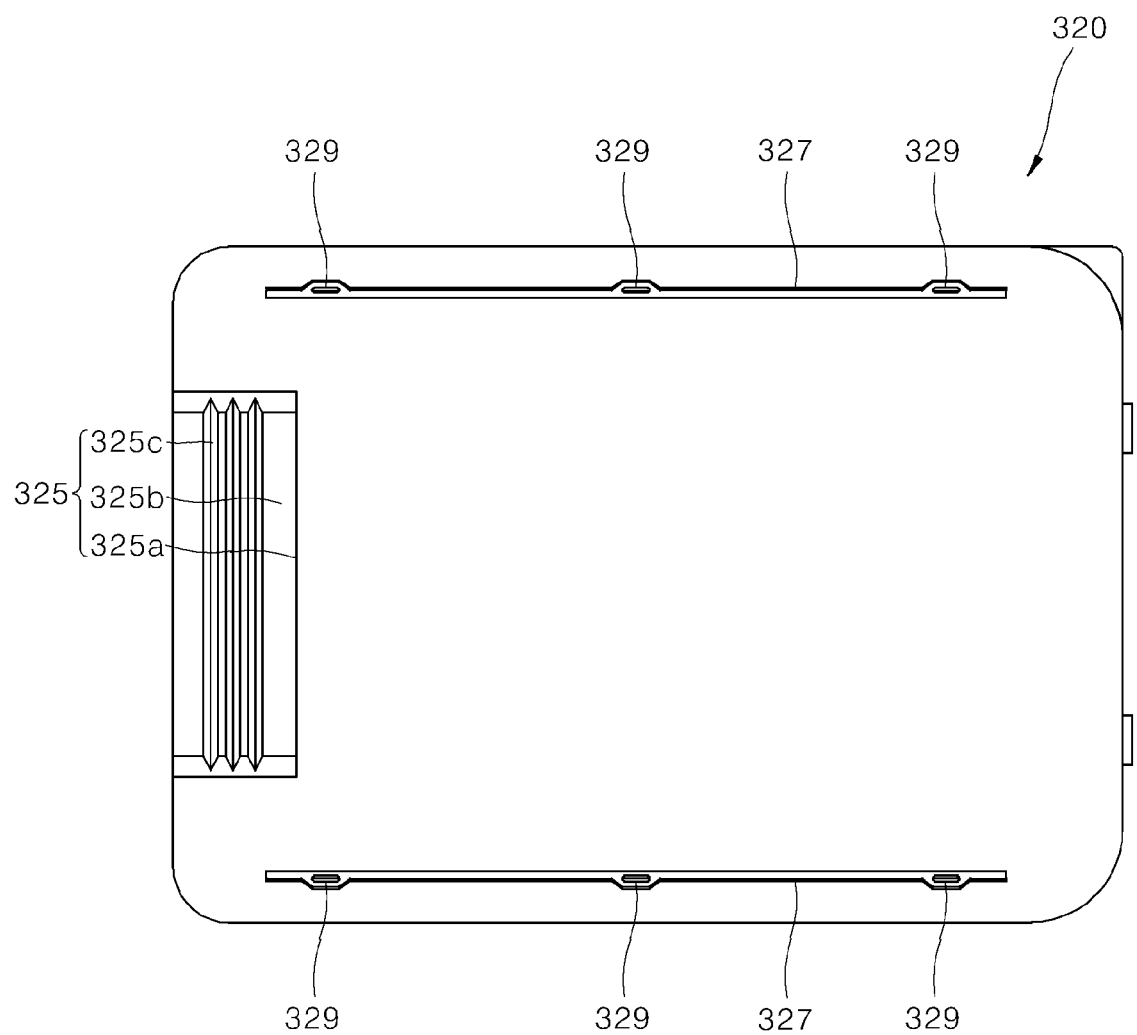
FIG. 18 is a bottom view showing the water tank in FIG. 17.

FIG. 15 may be an enlarged front view showing the front surface of a water tank that may be exposed to the front of a cooking appliance in one example, FIG. 16 may be a cross-sectional view along line ""XVI-XVI" in FIG. 15, and FIG. 17 may be a bottom perspective view separately showing a water tank of a cooking appliance in one example. FIG. 18 may be a bottom view showing the water tank in FIG. 17, and FIG. 19 may be a front cross-sectional view showing a coupling structure between a housing and water tank in one example.

Referring to FIGS. 15 to 18, the front surface of the water tank 320 may be exposed to the front of the second front panel 130 through the access hole 132. The front surface of the water tank 320 may have a shape comprising a planar surface that may be parallel with the vertically planar surface formed by the second front panel 130. Additionally, the front surface of the water tank 320 may be shaped into a planar surface that may closely correspond the vertically planar surface formed by the second front panel 130 (e.g., so that the front surface of the water tank 320 and the vertically planar surface formed by the second front panel 130 combine to form a single, smooth surface). The edge areas of both sides of the front surface of the water tank 320 may also be shaped into curved surfaces to reduce the possibility of a collision between the water tank 320 and the second front panel 130 and the risk of injuries caused by the water tank 320, while the water tank 320 may be withdrawn.

In the state where the control panel 200 covers the second front panel 130, the water tank 320 may be not exposed to the front of the cooking appliance. However, in the state where the control panel 200 moves away from and exposes the second front panel 130, the water tank 320 may be exposed to the front of the cooking appliance. The user may withdraw the water tank 320 exposed forward from the inside of the cooking appliance or insert the drawn water tank 320 into the cooking appliance through the access hole 132.

A grip part (or grip surface) 325 may be provided at the water tank 320 to allow the user to hold the water tank 320. The grip part 325 may be exposed toward the front of the water tank 320. In the example, the grip part 325 may form a groove that may be concave rearward from the front surface of the water tank 320, at the water tank 320. The grip part 325 may comprise a depressed surface part 325a and a connected surface part 325b.

The depressed surface part 325a may be spaced a predetermined distance apart from the front surface of the water tank 320 rearward. The connected surface part 325b may connect between the front surface of the water tank 320 and the depressed surface part 325a. An insertion space 326 surrounded by the connected surface part 325b and the depressed surface part 325a may be formed at the lower side of the connected surface part 325b. The insertion space 326 may be open forward.

In an example, the depressed surface part 325a may form a vertical wall surface that extends upward from the bottom surface of the water tank 320. The connected surface part 325b may connect to the upper end of the depressed surface part 325a. Accordingly, the insertion space 326 may be disposed at the front of the depressed surface part 325a and at the lower side of the connected surface part 325b. The insertion space 326 may be eccentric to the lower side of the water tank 320, and exposed to a position eccentric to the lower side of the front surface of the water tank 320.

In one example, the connected surface part 325b may incline upward toward the rear thereof. For example, the position of the connected surface part 325b becomes higher toward the rear thereof. Accordingly, the insertion space 326 may be formed in a way that the insertion space 236 expands upward toward the rear thereof. Since the insertion space 326 has the above-described shape, a space into which the user's finger comes may be effectively ensured in the insertion space 326, to allow the user to grip the water tank 320 reliably.

Further, the water tank 320 may further comprise a grip projection 325c. The grip projection 325c may be provided at the grip part 325, and protrude from the connected surface part 325b. A plurality of grip projections 325c may be disposed on the connected surface part 325b and spaced a predetermined distance apart from each other in the front-rear direction. Each of the grip projections 325c may protrude downward from the connected surface part 325b.

The connected surface part 325b may be a portion touched by the user's finger when the user puts the user's hand into the grip part 325. Since the connected surface part 325b may include the grip projections 325c, the user may grip the water tank 320 reliably, and the slip of the water tank 320 from the user's hand may be suppressed effectively.

Referring to FIGS. 9 and 17 to 19, a sliding projection 327 may be disposed between the housing 310 and the water tank 320. The sliding projection 327 may be disposed between the bottom surface part 311 of the housing 310, and the bottom surface of the water tank 320. In one example, the sliding projection 327 may be provided at the water tank 320, and the sliding projection 327 may protrude downward from the bottom surface of the water tank 320 to contact a top surface of the housing 310. In another example, the sliding projection 327 may be provided at the housing 310, and the sliding projection 327 may protrude upward from the bottom surface part 311 of the housing 310 to contact a bottom surface of the water tank 320.

A pair of sliding projections 327 may be disposed at the water tank 320 and spaced a predetermined distance apart from each other in the lateral direction. Each of the sliding projections 327 may be formed to extend in the front-rear direction.

The length of each of the sliding projections 327 in the lateral direction may be less than the length of the bottom surface part 311 of the housing 310 in the lateral direction. For example, the sliding projection 327 may be shaped into a long thin rod.

In terms of the water tank 320, the entire bottom surface of the water tank 320 may contact the bottom surface part 311 of the housing 310 through the sliding projection 327 without contacting the bottom surface part 311 of the housing 310. For example, an area where the bottom surface of the water tank 320 and the bottom surface part 311 of the housing 310 contact may be limited to a contact area between the sliding projection 327 and the bottom surface part 311.

The sliding projection 327 formed as described above may reduce a contact surface area between the housing 310 and the water tank 320, and reduce a frictional force that may be generated at a time when the water tank 320 moves. Further, a pair of guide projections 317 may be disposed at the housing 310 and spaced a predetermined distance apart from each other in the lateral direction, and each of the guide projections 317 may protrude upward from the bottom surface part 311 and extend in the front-rear direction.

The length of the guide projection 317 in the up-down direction maybe less than the length of the sliding projection 327 in the up-down direction. For example, while the sliding projection 327 contacts the bottom surface part 311 of the housing 310, the guide projection 317 does not contact the bottom surface of the water tank 320. A distance between the pair of guide projections 317 in the lateral direction may be greater than a distance between the pair of sliding projections 327 in the lateral direction. Additionally, the pair of sliding projections 327 provided at the water tank 320 may be disposed between the pair of guide projections 317.

The sliding projections 327 disposed between the pair of guide projections 317 as described above may move in the front-rear direction in an area limited between the pair of guide projections 317. For example, in terms of the guide projection 317, the area where the guide projection 317 moves may be limited, the water tank 320 may be prevented from shaking in the lateral direction while the water tank 320 moves in the front-rear direction.

Further, a lateral projection 329 may be provided at at least one of the housing 310 and the water tank 320. The lateral projection 329 may protrude from the guide projection 317 or the sliding projection 327, to be disposed between the guide projection 317 and the sliding projection 327 that face each other in the lateral direction.

In the example, the lateral projection 329 may be provided at the water tank 320, for example. A plurality of lateral projections 329 may be disposed on the bottom surface of the water tank 320 and spaced a predetermined distance apart from each other in the front-rear direction. Each of the lateral projections 329 may protrude from the sliding projection 327 in the lateral direction, and be disposed between the sliding projection 327 and the guide projection 317 that face each other in the lateral direction.

For example, the pair of sliding projections 327 may be disposed between the pair of guide projections 317, and the lateral projection 329 may be respectively disposed between the guide projection 317 and the sliding projection 327 that face each other in the lateral direction. A total of the lengths of the pair of lateral projections 329 in the lateral direction may correspond to a value calculated by deducting a distance between the pair of sliding projections 327 in the lateral direction from a distance between the pair of guide projections 317 in the lateral direction. For example, a distance between the guide projection 317 and the sliding projection 327 in the lateral direction, which face each other in the lateral direction, may correspond to the length of the lateral projection 329 in the lateral direction.

Accordingly, the lateral projection 329 may fill the distance between the guide projection 317 and the sliding projection 327 that face each other in the lateral direction, and the sliding projections 327 may move between the pair of guide projections 317, only in the front-rear direction, and may not move in the lateral direction. The lateral projection 329 may limit a lateral movement of the water tank 320 that moves in a passage formed between the pair of guide projections 317, in the front-rear direction. For example, the lateral projection 329 may suppress the generation of a lateral shake of the water tank 320 while the water tank 320 moves in the front-rear direction.

With the help of the lateral projection 329, a contact surface area between the guide projection 317 and the water tank 320 may be much less than a contact surface area between the sliding projection 327 and the guide projection 317. For example, the lateral projection 329 may reduce the contact surface area between the guide projection 317 and the water tank 320, resulting in a reduction in the frictional force that may be generated at a time when the water tank 320 moves.

In certain examples, each lateral projection 327 may be shaped into a curved surface. The lateral projection 329 may reduce a contact surface area between the guide projection 317 and the lateral projection 329 effectively. In the case where the lateral projection 329 may be shaped into a curved surface, the lateral projection 329 may be readily inserted into an area between the pair of guide projections 317, at a time when the water tank 320 may be inserted into the housing 310.

Figure 19:
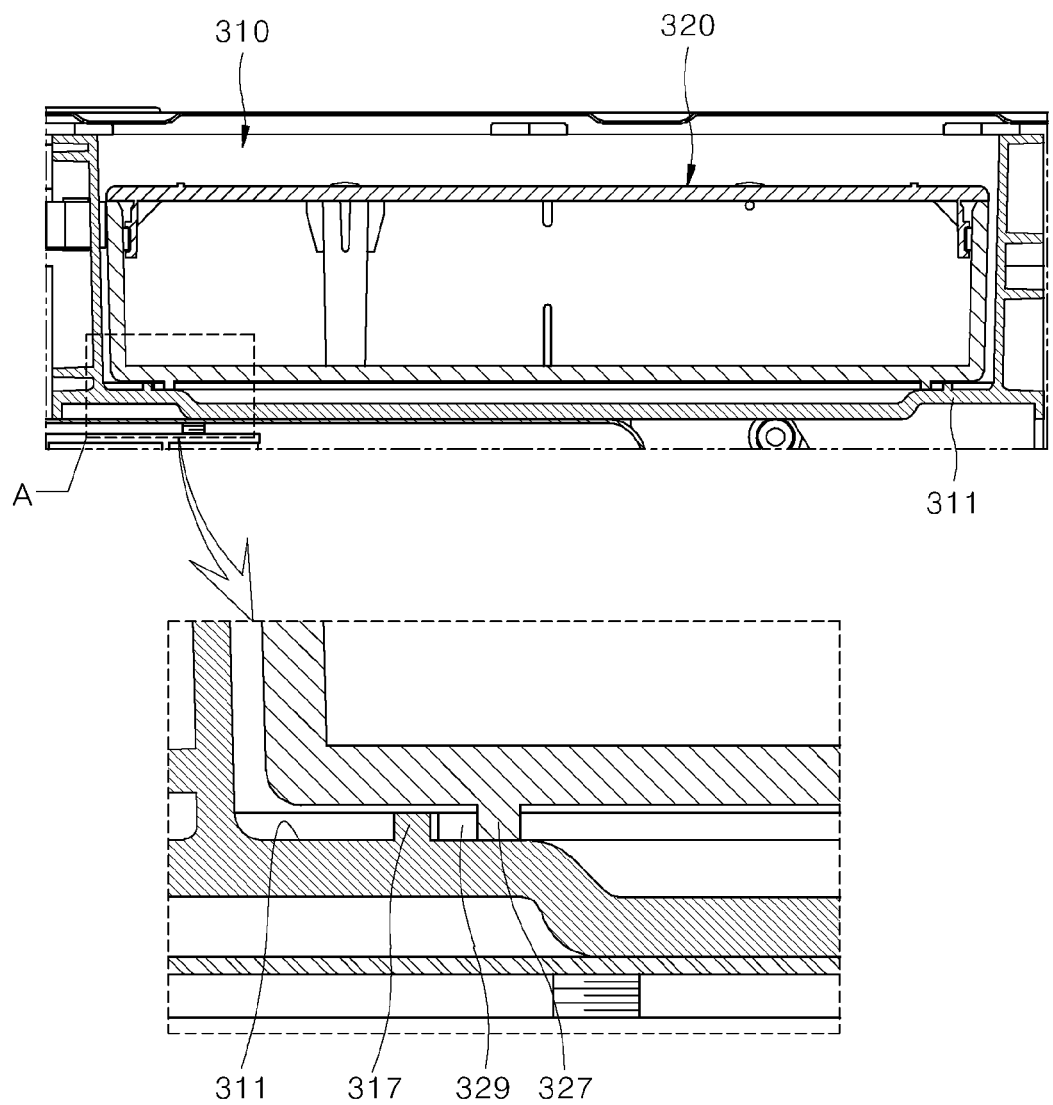
FIG. 19 is a front cross-sectional view showing a coupling structure between a housing and water tank in one example.

Referring to FIGS. 15, 16 and 19, the second front panel 130 may include a lower groove part (or lower groove) 134. The lower groove part 134 may be provided on the front surface of the first inner wall part 131a, and exposed toward the front of the first inner wall part 131a. The lower groove part 134 may be depressed rearward from the front surface of the first inner wall part 131a. A space surrounded by the lower groove part 134 on the first inner wall part 131a may be open forward and upward.

Additionally, the lower groove part 134 may be depressed downward from the upper end of the first inner wall part 131a. The lower groove part 134 formed as described above may be open upward toward the grip part 325. The lower groove part 134 may connect to the inner space of the grip part 325, i.e., the insertion space 326, in the up-down direction.

The lower groove part 134 may expand a front entrance of the insertion space 326 formed in the grip part 325. The lower groove part 134 may allow the user to put the user's hand into the grip part 325 and hold the water tank 320 readily. For example, the upper end of the first inner wall part 131a may be formed to incline downward toward the front. Accordingly, the lower groove part 134 that may be concavely depressed downward and forward may be provided at the upper end of the first inner wall part 131a.

[Control Panel and Surrounding Structure Thereof]

Figure 20:
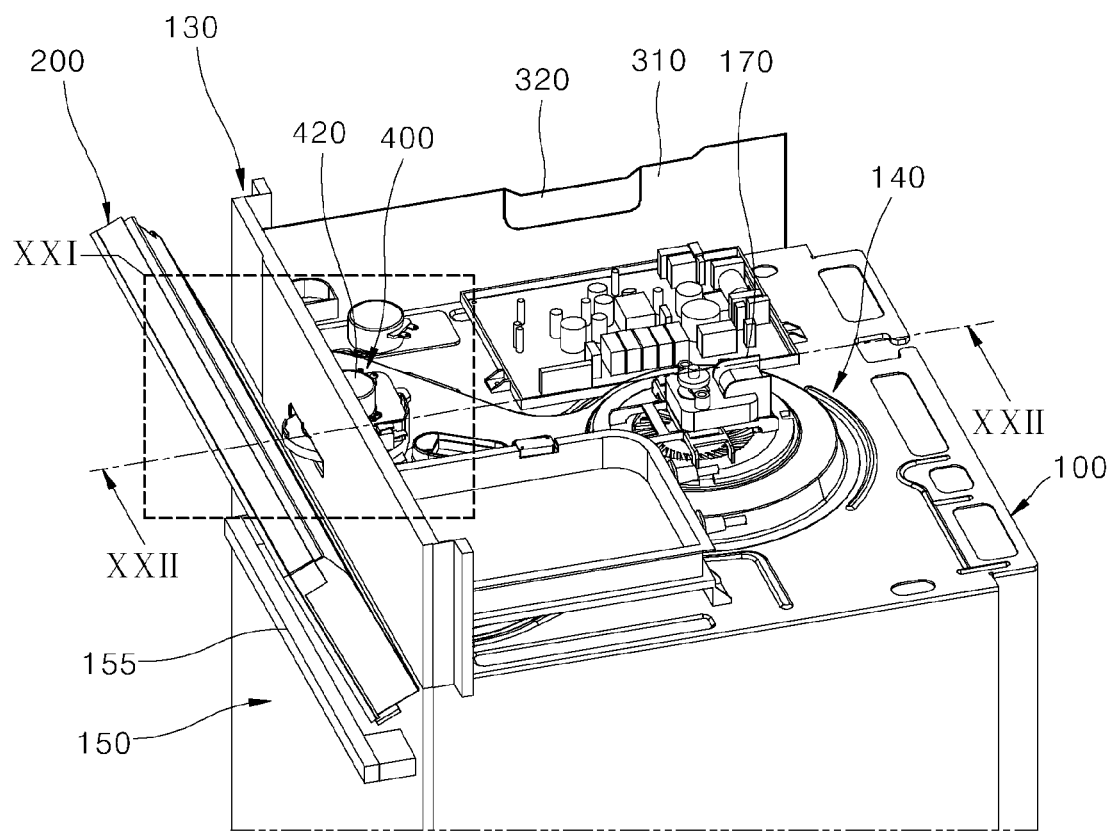
FIG. 20 is a view showing an operation state of an opening module of a cooking appliance in one example.
Figure 21:
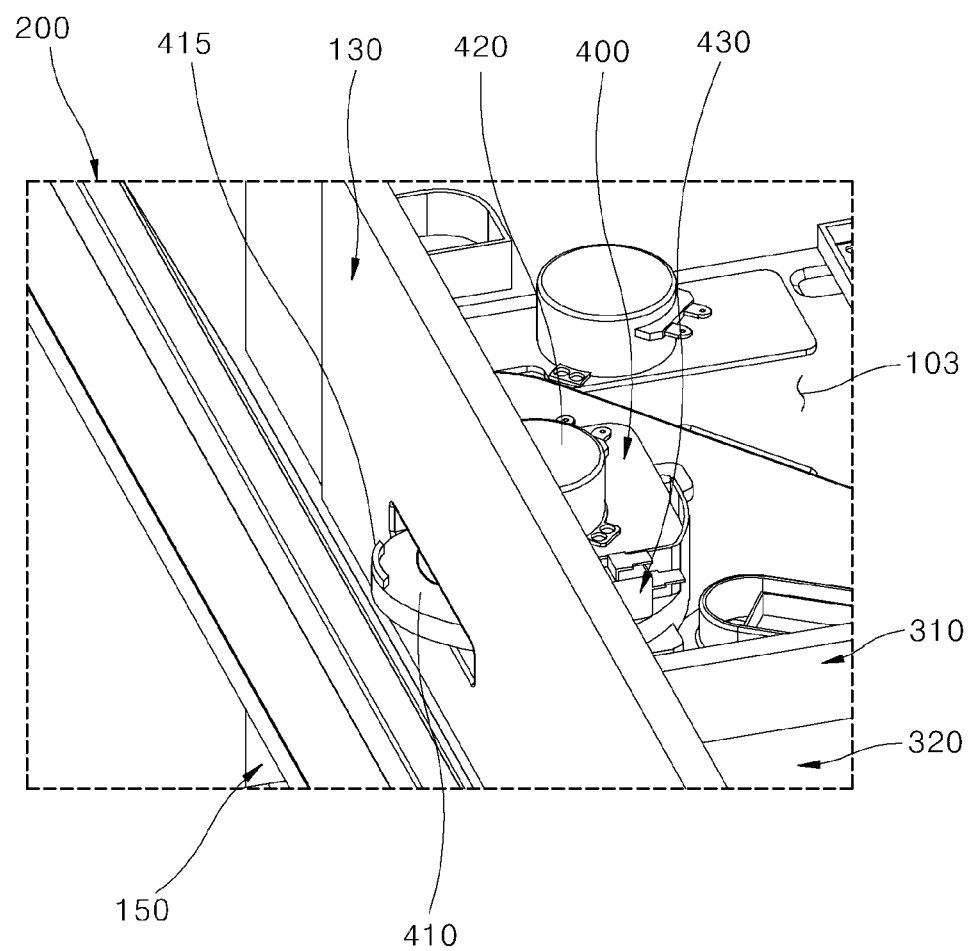
FIG. 21 is an enlarged view showing portion "XXI" in FIG. 20.

FIG. 20 is a view showing an operation state of an opening module of a cooking appliance in one example, and FIG. 21 is an enlarged view showing portion "XXI" in FIG. 20. Referring to FIGS. 4 to 5 and 20 to 21, the cooking appliance in one example may comprise control panel 200 that may be provided to open the second front panel 130 forward.

The control panel 200 may be provided to swivel between closing position and opening position. For example, the closing position may be position of the electronic component space 103 or the control panel 200 that blocks a structure disposed at the front of the electronic component space 103, from the front. The opening position may be the position of the electronic component space 103 or the control panel 200 that opens a structure disposed at the front of the electronic component space 103, forward, for example. When the front of the electronic component space 103 is blocked by the second front panel 130, closing position may be defined as the position of the control panel 200 that blocks the second front panel 130 from the front of the second front panel. The opening position may be defined as the position of the control panel 200 that opens the second front panel 130 forward.

If the second front panel 130 is not between the electronic component space 103 and the control panel 200, the closing position may be defined as the position of the control panel 200 that blocks the electronic component space 103 from the front of the electronic component space 103. Then, the opening position may be defined as the position of the control panel 200 that opens the electronic component space 103 forward.

The cooking appliance in the example may further comprise a hinge module 250. The hinge module 250 may support the control panel 200 in a way that the control panel 200 can swivel around an axis in the lateral direction. The center of the swivel of the control panel 200 may be disposed further downward than the center of the control panel 200 in the up-down direction. In an example, the control panel 200 may swivel around the lower end of the control panel 200.

As the control panel 200 swivels from the closing position to the opening position, the control panel 200 may swivel around the lower end thereof and be unfolded forward. At this time when the control panel 200 swivels forward around a lower end to an open position, the rear surface of the control panel 200 faces upward, and the front surface of the control panel 200 faces downward.

As the control panel 200 swivels from the opening position to the closing position, the control panel 200 may swivel around the lower end thereof and stand vertically. The control panel 200 may stand in parallel with the second front panel 130 and block the second front panel 130 from the front thereof. At this time when the control panel 200 swivels around a lower end to then closed position, the front surface of the control panel 200 faces forward (e.g., away from the second front panel 130), and the rear surface of the control panel 200 faces rearward (e.g., toward the second front panel 130).

The control panel 200 may be swivably coupled to the main body 100 with the hinge module 250. The cooking appliance may include a pair of hinge modules 250, and the pair of hinge modules 250 may be spaced a predetermined distance from each other in the lateral direction. For example, the pair of hinge modules 250 may be spaced from each other by a distance close to the length of the control panel 200 in the lateral direction. Accordingly, each of the hinge modules 250 may connect to the control panel 200, in a position adjacent to the end portion of the control panel 200 in the lateral direction.

At least a portion of each of the hinge modules 250 may be disposed in the electronic component space 103. Each of the hinge modules 250 may be coupled at least one of the protruding surface part 123, 125 that protrudes upward from the lateral end of the first front panel 120, the lateral surface of the cavity 110 that protrudes upward toward the electronic component space 103 from the cooking space 101, and the upper panel 140 that defines the lower boundary surface of the electronic component space 103, and fixed to the inside of the electronic component space 103.

Each of the hinge modules 250 may comprise a hinge part (or hinge) 251 and a hinge case 255. The hinge part 251 may be provided to support the control panel 200 swivably. The hinge part 251 may be hinge-coupled to the control panel 200 in a position eccentric to the lower side of the control panel 200.

The hinge case 255 may form the exterior of the hinge module 250, and accommodate at least a portion of the hinge part 251. The hinge case 255 may support the hinge part 251 swivably. For example, the control panel 200 may be swivably supported by the end portion of the front of the hinge part 251, and the end portion of the rear of the hinge part 251 may be swivably supported by the hinge case 255.

In one example, the hinge case 255 may be shaped into a cuboid, for example. In an example, the hinge case 255 may be shaped into a rectangle box that has a relatively narrow width in the lateral direction and has a relatively long length in the front-rear direction.

The hinge case 255 formed as described above may be disposed in the electronic component space 103. Each of the hinge modules 250 may be disposed at the rear of the protruding surface part 123, 125 that protrudes upward from the lateral end of the first front panel 120, and accordingly, each hinge case 255 may be disposed at the rear of the protruding surface part 123, 125.

The front surface of the hinge case 255 may be disposed to face the rear surface of the protruding surface part 123, 125. The front surface of the hinge case 255 may be coupled to the protruding surface part 123, 125. In one example, the front surface of the hinge case 255 may be coupled to the protruding surface part 123, 125, and the lateral surface of the hinge case 255 may be coupled to the lateral surface of the cavity 110. Since two or more surfaces of the hinge case 255 may be coupled to the main body 100, the hinge module 250 may support the control panel 200 reliably.

Additionally, each of the protruding surface parts 123, 125 may include a passage hole 124. The passage hole 124 may be formed in a way that penetrates the protruding surface part 123, 125 in the front-rear direction. The passage hole 124 may be disposed on the front surface of the hinge case 255 and may be disposed in an area where the passage hole 124 overlaps the hinge part 251 in the front-rear direction. The hinge part 251 may pass through the protruding surface part 123, 125 through the passage hole 124 that may be formed as described above.

Further, the second front panel 130 may have a passage hole 130a that communicates with the passage hole 124. The hinge part 251 may penetrate the first front panel 120 and the second front panel 130 through the passage hole 124 of the first front panel 120 and the passage hole 130a of the second front panel 130.

[Structure and Operation of Opening Module]

Figure 22:
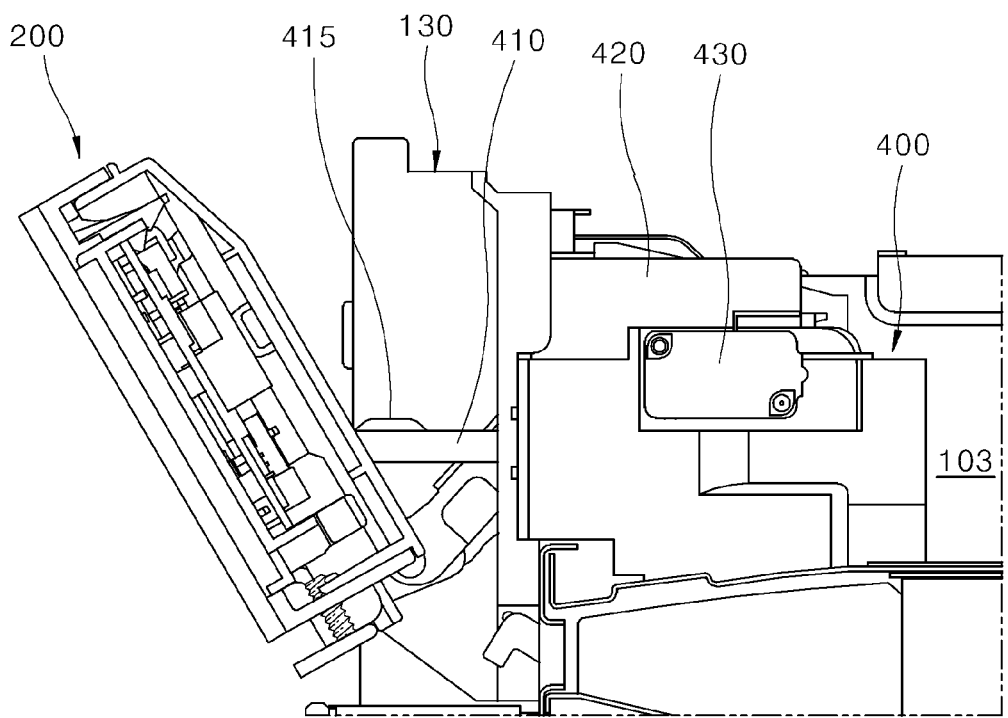
FIG. 22 is a cross-sectional view along line "XXII-XXII" in FIG. 20.
Figure 23:
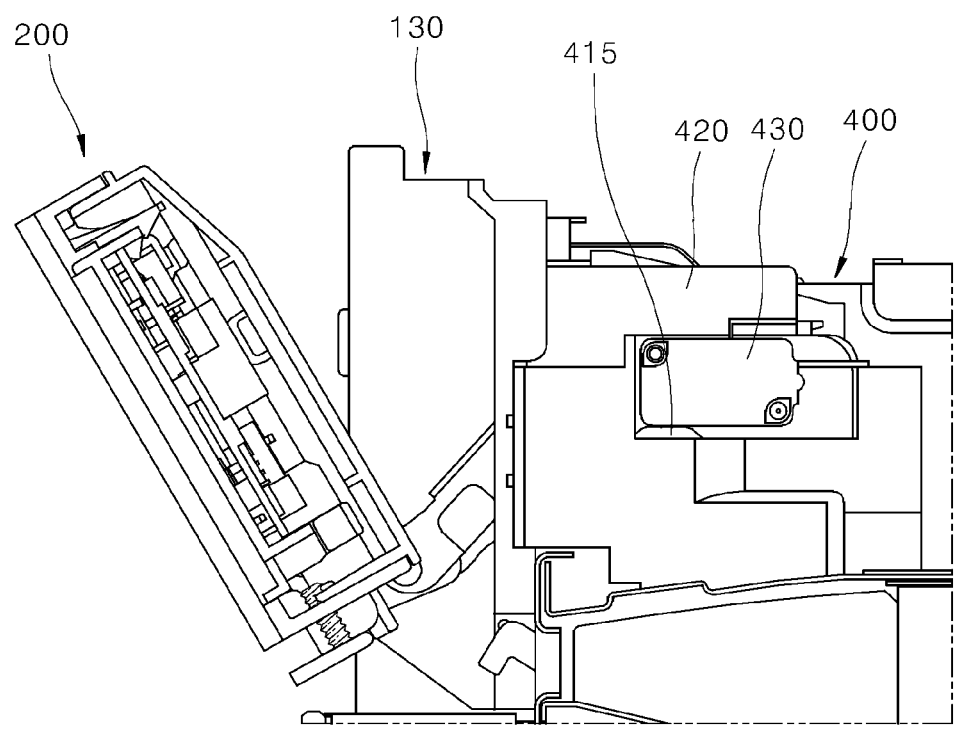
FIG. 23 is a view showing a rotation state of a push member in FIG. 21.

FIG. 22 may be a cross-sectional view along line "XXII-XXII" in FIG. 20, and FIG. 23 may be a view showing a rotation state of a push member in FIG. 21. Referring to FIGS. 20 to 22, the cooking appliance in one example may further comprise an opening module 400. The opening module 400 may be provided to push the control panel 200 in the closing position forward and move the control panel 200 to the opening position.

The opening module 400 may comprise a pushing member 410. The pushing member 410 may be disposed at the rear of the control panel 200 such way that the pushing member 410 can rotate. In one example, the pushing member 410 may be provided to rotate around an axis in the up-down direction. The pushing member 410 may be shaped into a cam corresponding to eccentric wheel or a cylinder with an irregular shape. A portion of the pushing member 410 may protrude further than the remaining portion of the pushing member 410 in the centrifugal direction.

In one example, the pushing member 410 may be shaped into a cam that pushes the control panel 200 forward based on contacting the rear surface of the control panel 200 at least once while the pushing member 410 rotates once. Accordingly, while the pushing member 410 rotates once, the rear surface of the control panel 200 may contact the pushing member 410. As the rear surface of the control panel 200 contacts the pushing member 410, as described above, the pushing member 410 may contact the rear surface of the control panel 200 and push the control panel 200 forward, and the control panel 200 may be pushed forward by the pushing member 410 and moved toward the opening position.

The opening module 400 may be disposed in the electronic component space 103. The pushing member 410 provided at the opening module 400 may also be disposed in the electronic component space 103. For example, the pushing member 410 may be disposed at the rear of the second front panel 130. When the control panel 200 is in the closing position, the entire area of the pushing member 410 may be disposed at the rear of the second front panel 130. As the pushing member 410 starts to rotate, a partial area of the pushing member 410 may protrude toward the front of the second front panel 130.

The second front panel 130 may have a camp passage hole 136. The cam passage hole 136 may be formed at the panel main body part 131 in a way that penetrates the panel main body part 131 in the front-rear direction. The cam passage hole 136 may form a passage allowing the pushing member 410 to pass through the second front panel 130.

A partial area of the pushing member 410 may protrude to the front of the second front panel 130 through the cam passage hole 136. In this state in which a portion of pushing member 410 extends through the cam passage hole 136, the pushing member 410 may keep rotating and return to a position in which the entire area of the pushing member 410 returns to be disposed at the rear of the second front panel 130 (hereafter, "a standby position").

The opening module 400 may tilt the control panel 200 disposed in the closing position forward, with a predetermined gradient. In one example, the predetermined gradient may be a gradient of the control panel 200 associated with moving the control panel 200 to the opening position using the weight of the control panel 200. For example, the gradient of the control panel 200 in the opening position may be 0° while the gradient of the control panel in the closing position may be 90°, and the predetermined gradient may be set in a range of 30 to 60°. The predetermined gradient may change based on the position of the center of gravity of the control panel 200, the position of the swivel center of the control panel 200, the properties of the hinge module 250 and the like.

The pushing member may push the control panel 200 forward to tilt the control panel 200 with the predetermined gradient, while the pushing member 410 rotates as the opening module 400 operates and tilts the control panel 200 forward. The gradient of the control panel 200 that tilts forward may be adjusted based on a distance at which the pushing member 410 pushes the control panel 200. The distance at which the pushing member 410 pushes the control panel 200 may vary depending on the shape of the pushing member 410. For example, as the diameter and eccentricity of the pushing member 410 increase, the distance at which the pushing member 410 pushes the control panel 200 may increase.

In another example, the predetermined gradient may be the gradient of the control panel 200, which allows the control panel 200 to move to the opening position, only in the case where an external force may be additionally applied. For example, in the case where the control panel 200 swivels to a position further forward than the closing position but cannot swivel to the opening position on its own, the gradient of the control panel 200 may be set to the predetermined gradient.

A primary opening operation of the control panel 200 may be performed based on the operation of the opening module 400, and when the user manually pulls the opening module forward, the control panel 200 may move to the opening position. The predetermined gradient may be set to a value at which the control panel 200 may be in the position where the user easily holds and pulls the control panel 200 and in the position where the control panel 200 cannot move to the opening position by using its self weight. Thus, the user can move the control panel 200 to the opening position conveniently and readily, and the inadvertent full opening of the control panel 200 caused by unintentional manipulation errors can be prevented.

Additionally, the opening module 400 may further comprise a driving part 420. The driving part 420 may be provided to supply power for rotating the pushing member 410. The driving part 420 may comprise a driving motor generating a rotational force for rotating the pushing member 410.

Additionally, the opening module 400 may further comprise a pushing member sensing part (or pushing member sensor) 430. The pushing member sensing part 430 may be provided to control the operation of the driving part 420. In one example, the pushing member sensing part 430 may sense the position of the pushing member 410, and based on the sensing results, a controller controlling the operation of the cooking appliance may control the operation of the driving part 420.

The pushing member sensing part 430 may include a sensor that contacts at least a portion of the pushing member 410 and senses the position of the pushing member 410. In one example, the pushing member sensing part 430 comprises a micro switch-type sensor, and the pushing member sensing part 430 may be turned on/off based on the movement of an actuator protruding on the micro switch. As described below, the actuator protruding on the micro switch may contact and be moved based on contacting a portion of the pushing member 410.

For example, a contact projection 415 to selectively contact the actuator of the micro switch may be provided at the pushing member 410. The contact projection 415 may protrude from the pushing member 410. The position of the contact projection 415 may change while the contact projection 415 rotates together with the pushing member 410. In one example, the contact projection 415 may be disposed in a position adjacent to the outer circumferential surface of the pushing member 410.

The contact projection 415 may be provided to contact the actuator protruding on the sensor of the pushing member sensing part 430. The sensor may be turned on/off based on the movement of the actuator in contact with the contact projection 415, and the pushing member sensing part 430 may generate a signal indicating whether the sensor is turned on/off. The position of the pushing member 410 may be determined based on the signal generated by the micro switch.

In an example, the sensor of the pushing member sensing part 430 may be disposed at the upper side of the pushing member 410. The actuator of the sensor may protrude downward toward the pushing member 410, and the contact projection 415 may protrude upward from the pushing member 410 toward the sensor. In the example, the pushing member sensing part 430 and the contact projection 415 may be provided to find the position of the pushing member 410. For example, the pushing member sensing part 430 and the contact projection 415 may be provided to determine whether the pushing member 410 returns to the standby position.

Accordingly, the position of the contact projection 415 may be set to a position where the contact projection 415 contacts the actuator of the sensor as the pushing member 410 returns to the standby position. As the pushing member 410 returns to the standby position, the sensor of the pushing member sensing part 430 may be turned on. Thus, the driving part 420 stops operating, and the position of the pushing member 410 may stay in the standby position.

The control panel 200 may include a plurality of buttons for setting an operation of the heating part, and may also include a button for setting an opening and closing operation of the control panel 200 (hereafter, a "control panel opening and closing button"). When the user presses the control panel opening and closing button, the driving part 420 starts to operate, and accordingly, the pushing member 410 starts to rotate. The pushing member 410, which starts to rotate as described above, may push the control panel 200 forward.

The control panel 200, which may be pushed forward as described above, may incline with the predetermined gradient, and then move to the opening position. The control panel 200 may move to the opening position by using its self weight when the control panel 200 inclines forward by the predetermined gradient away from a vertical closed position. In another example, in the state where the control panel 200 inclines with a gradient similar to the predetermined gradient, the user may move the control panel 200 to the opening position manually.

As the pushing member 410 rotates as described above, the contact projection 415 may move together with the pushing member 410. As the contact projection 415 moves and contacts the actuator of the sensor as illustrated in FIG. 23, the sensor may be turned on based on the movement of the actuator in contact with the contact projection 415 and generate a signal. The driving part 420 stops operating based on the signal generated by the sensor, and accordingly, the pushing member 410 stops moving. At this time, the pushing member 410 may stop moving in the standby position and stay in the standby position. Thus, the pushing member 410 may remain in the main body 100 without protruding out of the main body 100.

As the position of the control panel 200 changes to the opening position, the second front panel 200 hidden behind the control panel 200 may be exposed forward as illustrated in FIG. 4. If the pushing member 410 keeps protruding to the front of the second front panel 130 in this state, the aesthetic qualities of the cooking appliance may deteriorate, and the control panel 200 and the pushing member 410 may collide with each other when the control panel 200 returns to the closing position.

If the control panel 200 and the pushing member 410 collide with each other as the control panel 200 returns to the closing position, undesirable noises may be caused due to the collision, and the control panel 200 or the opening module 40 may be damaged. In addition, the control panel 200 may not move to the closing position completely.

To prevent the control panel 200 and the pushing member 410 from colliding, the pushing member 410 may stop after pushing the control panel 200 and stays in the standby position. For example, the pushing member sensing part 430 may sense the position of the pushing member 410, and based on the sensing results, the operations of the pushing member 410 and the driving part 420 rotating the pushing member 410 may be controlled.

Thus, the cooking appliance in the example may prevent the generation of noise or damage to the control panel 200 or the opening module 400 effectively, during the processes of opening and closing the control panel 200. Further, for the cooking appliance in the example, the exterior of the rear of the control panel 200 may ensure aesthetic qualities, regardless of the opening state of the control panel 200, and the control panel 200 may be opened and closed smoothly.

[Opening and Closing Structure of Control Panel]

Referring to FIGS. 2 to 5, the cooking appliance in one example may be provided in the form of a small-and-medium-sized steam oven. In a cooking appliance provided in the form of a small-and-medium-sized steam oven, it may be difficult to obtain a space for disposing the water supply device 300 between the cavity having the cooking space and the control panel. To disposed the water supply device 300 between the cooking space and the control panel, an up-down gap tall enough for the water supply device 300 should be provided between the upper surface of the cavity and the control panel. However, the gap may be difficult to provide in the small-and-medium-sized steam oven.

The control panel 200 provided in the cooking appliance may serve as a cover blocking the water supply device 300, particularly the water tank 320, from the front. The control panel 200 may be provided in a way that entirely covers the electronic component space 103 where the water supply device 300 is disposed from the front. The front surface of the electronic component space 103 may be covered by the control panel 200, but as the control panel 200 moves to the opening position, the inside of the electronic component space 103 may be open forward. To prevent the electronic component space 103 from opening forward, the second front panel 130 may be provided on the front surface of the electronic component space 103. The second front panel 130 may be disposed at the front of the electronic component space 103 and serve as a cover that covers the electronic component space 103 from the front of the electronic component space 103.

Ordinarily, the first front panel 120 may be made of a metallic material that resists high temperature, while ensuring structural rigidity. Unlike the first front panel 120, the second front panel 130 may be made of a synthetic resin such as plastics and the like. The second front panel 130 does not need to support a heavy load, and temperature around the electronic component space 103 where the second front panel 130 is disposed may be less than temperature around the cooking space 101 where the first front panel 120 may be disposed. Accordingly, the front surface of the electronic component space 103 may be covered by the second front panel 130 made of a material that may be relatively lightweight and cheaper in comparison to a metal plate that may be heavy and relatively expensive.

For the water tank 320 to be withdrawn and inserted, a passage for allowing the water tank 320 to come in and out may be formed on the front surface of the electronic component space 103. The passage may be provided by the access hole 132 formed on the second front panel 130. The water tank 320 may come in and out through the access hole 132, and the front surface of the water tank 320 mounted in the electronic component space 103 may be exposed to the front of the second front panel 130 through the access hole 132.

The control panel 200 may block the exposure of the front surface of the water tank 320 and the access hole 132, while blocking the second front panel 130 from the front thereof. The control panel 200 may swivel to the opening position to expose the access hole 132 forward, and in this state, the water tank 320 may come in and out.

Additionally, the area in which the second front panel 130 is disposed may be an area that extends horizontally and may be easily bent and deformed and the like. The area may be not exposed unless the control panel 200 is provided in a way that opens and closes the access hole 132.

When the control panel 200 is provided as described in the examples provided in the drawings, the area associated with the second front panel 130 may be exposed together with the access hole 132 when the control panel 200 opens the access hole 132. When the second front panel 130 may be integrated with the first front panel 120, a bend deformation and the like of the second front panel 130 may be exposed in the case where the control panel 200 opens the access hole 132. Further, a structure in relation to the opening of the control panel 200, a structure in relation to the coming in and out of the water tank 320, a structure in relation to the fixation of the housing 310 and the like may be provided at the second front panel 130.

If the second front panel 130 and the first front panel 120 are both made of a metallic material, the structures cause formation of the second front panel 130 to be a labor-intensive and costly. To prevent the costly and labor-intensive formation of the second front panel 130, the second front panel 130 may be not integrated with the first front panel 120 and may be provided apart from the first front panel 120, in one example.

For example, the second front panel 130, when configured as described above, may be made of a synthetic resin material such as plastics and the like, unlike the first front panel 120 which made of a metallic material. For example, the second front panel 130 may be made of a synthetic resin material having stiffness that is equal to or greater a stiffness of a metallic material of the first front panel 120. Since the second front panel 130 may be provided as described above, the bend deformation of the second front panel 130 may be prevented, and the exterior of the second front panel 130, which is exposed as the control panel 200 opens the access hole 132, may look smooth and neat.

Additionally, since the second front panel 130 may be provided as described above, the structure in relation to the opening of the control panel 200, a structure in relation to the coming in and out of the water tank 320, a structure in relation to the fixation of the housing 310 and the like can be molded together with the second front panel 130, thereby making it possible to easily manufacture the second front panel 130 and the relevant structures at relatively low costs.

Figure 24:
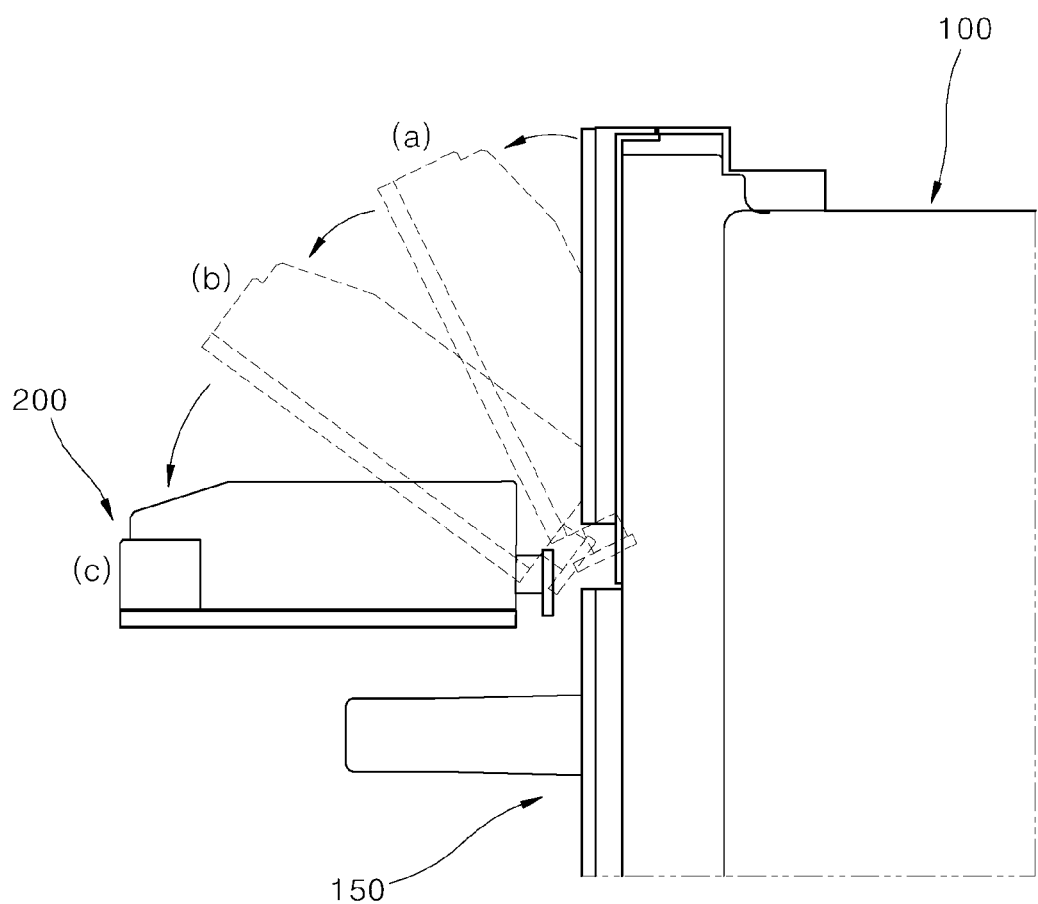
FIG. 24 is a view showing a change in the gradients of a control panel of a cooking appliance in one example.
Figure 25:
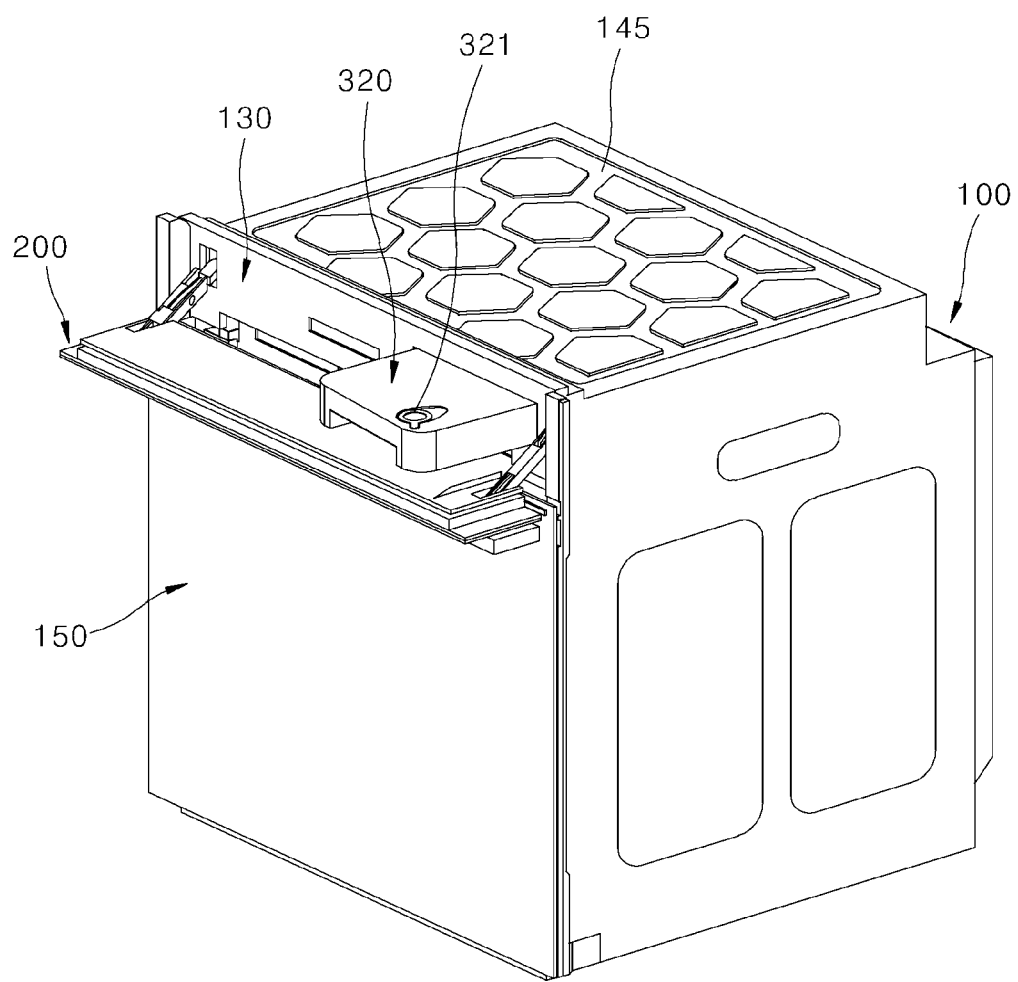
FIG. 25 is a perspective view showing a drawn state of a water tank of a cooking appliance in one example.

FIG. 24 is a view showing a change in the gradients of a control panel of a cooking appliance in one example, and FIG. 25 is a perspective view showing a withdrawn state of a water tank of a cooking appliance in one example. Referring to FIGS. 22 to 24, the opening operation of the control panel 200 in the example may be performed automatically. For example, as the user presses the control panel opening and closing button, the opening module 400 may push the control panel 200 forward (see FIGS. 22 and 23). Accordingly, the control panel 200 inclines with the predetermine gradient (see FIG. 24 (position a)) and then move to the opening position while gradually inclining forward by using its self weight (see FIG. 24 (position b)).

Since the opening operation of the control panel 200 may be performed automatically as described above, the cooking appliance of the example may help to reduce inconvenience caused by a manual operation and the risk of injuries of the user, caused by a manual operation.

The opening operation of the control panel 200 in the example may be performed in a way that the control panel 200 swivels downward and may be unfolded forward, and this may be an important factor for enabling an automatic opening operation of the control panel 200.

The control panel 200 in the example may swivel around the lower end of the control panel 200, while swiveling between the closing position and the opening position. The control panel 200 swivels around the lower end of the control panel 100 and move to the opening position.

The control panel 200 may swivel downward and move to the opening position, and be unfolded forward in the opening position. The control panel 200 inclines with the predetermined gradient, based on the operation of the opening module 400, and then moves to the opening position by using its self weight.

This results from the downward swivel and the forward spread of the control panel 200. In the case of a control panel 200 that swivels upward, the above-described operation of the opening module 400 may not result in the automatic opening operation of the control panel 200.

Further, the control panel 200 swiveled to the opening position and unfolded forward, as illustrated in FIGS. 24 and 25, may be disposed between the door 150 and the water tank 320.

For example, in the case where the control panel 200 swivels to the opening position and may be unfolded forward, the water tank 320 may be disposed further upward than the control panel 200, while the water tank 320 may be drawn from the electronic component space 103 or inserted into the electronic component space 103.

Further, in the state where the control panel 200 swivels to the opening position and may be unfolded forward, the access hole 132 may be disposed further upward than the control panel 200.

Accordingly, the control pane 200 having opened the access hole 132 for allowing the water tank 320 to come in and out may be disposed further downward than the path in which the water tank 320 moves.

Since the control panel 200 may be disposed further downward than the path in which the water tank 320 moves, the control panel 200 does not serve as an obstacle that covers the access hole 132 and the water tank 320, from the user's sight.

Thus, while the water tank 320 may be drawn or inserted, the access hole 132 and the water tank 320 may be easily seen, and the user does not need to move or bend to see the position of the access hole 132, ensuring improvement in ease of use and safety of the cooking appliance. Further, the control panel 200, disposed further downward than the path in which the water tank 320 moves, may support the water tank 320 from below while the water tank 320 may be drawn or inserted, and guide the path of movement of the water tank 320. Thus, the user may draw or insert the water tank 320 in a safe and convenient manner.

Further, the control panel 200, when folded and disposed between the water tank 320 and the door 150 as described above, may serve as a structure that blocks between the door 150 and the water tank 320. For example, the control panel 200 may blocks water flowing from the water tank 320 from being dropped to the door 150 and contaminating an area around the door 150. Further, the control panel 200 may also block heat discharged upwards from the upper end of the door 150 and an area around the upper end of the door (e.g., the cooking space) from being delivered to the user when the user draws or insert the water tank 320.

In one example, the control panel 200 comprises the input part for adjusting the operation of the cooking appliance, and the display displaying the operation state of the cooking appliance. In another example, the control panel may be provided as a simple panel that does not comprise the input part, the display and the like. The control panel may be disposed at the front of the electronic component space 103, cover the electronic component space 103, swivel downward and move to the opening position, and be unfolded in the opening position, like the control panel 200 provided above as an example.

In another example, the control panel 200 may also be provided in a way that a portion of the control panel may be open while another portion of the control panel 200 remains closed. For example, the control panel 200 may have a structure in which the control panel 200 may be divided into a plurality of areas along the lateral direction. For example, a portion of the cover panel 200 at an area covering the water tank 320 from the front of the water tank 320 may swivel downward and may be unfolded forward to expose the water tank, while other ones of the plurality of areas of the control panel 200 remain fixed without being open.

In yet another example, the control panel 200 may have a structure in which the control panel may be divided into a plurality of areas along the up-down direction. An upper area covering a front the water tank 320 may swivel downward and may be unfolded forward to expose the water tank 320, while other remaining areas of the control panel 200 remain fixed without being open.

As aspect of the present disclosure may provide a cooking appliance that ensures improvement in the opening and closing structure of a control panel, to prevent the control panel from serving as an obstacle that blocks a water tank, while the water tank may be drawn or inserted. Another aspect of the present disclosure may ensure an automatic opening of the control panel simply based on an additional configuration/an additional component. Yet another aspect of the present disclosure may enable the control panel to help to improve safety at a time when the water tank may be drawn or inserted.

According to one aspect of the present disclosure, in the cooking appliance, the control panel may be disposed at the front of the electronic component space, and may be unfolded forward while swiveling forward. According to another aspect of the present disclosure, the control panel opening and closing the front surface of the electronic component space may open the front surface of the electronic component space while swiveling downward, and may open the front surface of the electronic component space while being unfolded forward. According to another aspect of the present disclosure, the control panel opening and closing the front surface of the electronic component space may swivel around the lower end of the control panel.

According to yet another aspect of the present disclosure, the second front panel may be disposed at the upper side of the first front panel disposed at the front of the cooking space, and disposed at the front of the electronic component space disposed at the upper side of the cooking space, the exit of the water tank coming into and out of the electronic component space may be formed on the second front panel, and the control panel may be disposed at the front of the second front panel. The control panel disposed at the front of the second front panel may open the exit of the water tank forward while swiveling downward and being unfolded forward.

The cooking appliance according to one aspect of the present disclosure may comprise: a cavity having a cooking space therein, the cooking space having an open front; a door being disposed at a front of the cavity, and opening and closing the cooking space; an electronic component space being disposed at an upper side of the cooking space; and a control panel being disposed at a front of the electronic component space, and swiveling downward and being unfolded forward.

The control panel may swivel around an axis in a lateral direction, and a swivel center of the control panel may be placed further downward than a center of the control panel in an up-down direction. The control panel may be provided to swivel between a closing position in which the control panel blocks the electronic component space and an opening position in which the control panel may be unfolded forward. A rear surface of the control panel may face rearward in the closing position, and the rear surface of the control panel may face upward as the control panel swivels to the opening position.

According to the present disclosure, the cooking appliance may further comprise a water tank being disposed in the electronic component space. The water tank may be provided in a way that the water tank may be drawn to the front of the electronic component space. The control panel may be disposed between the door and the water tank, in the opening position. The water tank may be disposed further upward than the control panel swiveled to the opening position.

According to the present disclosure, the cooking appliance may further comprise: a front panel blocking a front of the electronic component space and being disposed between the electronic component space and the control panel. An access hole may be provided on the front panel and forms a passage allowing the water tank to pass through the front panel. The access hole may be placed further upward than the control panel unfolded forward.

According to the present disclosure, the cooking appliance may further comprise an opening module pushing the control panel in the closing position forward and moving the control panel to the opening position. The control panel may be provided to swivel between the closing position in which the control panel blocks the electronic component space and the opening position in which the control panel may be unfolded forward. A hinge module may support the control panel to allow the control panel to swivel around a lower end of the control panel. The opening module may tilt the control panel in the closing position forward with a predetermined gradient, and the predetermined gradient may be a gradient of the control panel, with which the control panel moves to the opening position by using its self weight. The opening module may comprise a pushing member being provided rotatably. The pushing member may be shaped into a cam pushing the control panel forward at least once during one rotation.

The opening module may further comprise a sensor sensing a position of the pushing member while contacting at least a portion of the pushing member. The opening module may further comprise a contact projection which protrudes from the pushing member and a position of which changes while the contact projection rotates together with the pushing member, and the sensor may generate a signal at a time when the sensor contacts the contact projection. The sensor may be disposed above the pushing member, and the contact projection may protrude upward from the pushing member.

According to the present disclosure, the cooking appliance further comprise a hinge module supporting the control panel and allowing the control panel to swivel around the lower end of the control panel. According to the present disclosure, the cooking appliance may further comprise a first front panel being disposed between the cavity and the door. A portion of the first front panel may protrude to the upper side of the cavity, and the hinge module may be coupled to at least any one of the cavity and the first front panel.

The hinge module may comprise a hinge part swivably supporting the control panel, and a hinge case accommodating and supporting the hinge part. The hinge case may be disposed in the electronic component space. The first front panel may comprise a protruding surface part protruding upward from a lateral end of the first front panel, and a front surface of the hinge case, being disposed at a rear of the protruding surface part, may be coupled to the protruding surface part. A passage hole may be formed in a way that penetrates the protruding surface part in a front-rear direction, and the hinge part may pass through the protruding surface part through the passage hole.

According to the present disclosure, the cooking appliance may further comprise a second front panel being disposed between the electronic component space and the control panel and blocking the front of the electronic component space. The second front panel may be coupled to the first front panel. The second front panel may be coupled to the protruding surface part.

In the cooking appliance of the present disclosure, the control panel may swivel downward and may be unfolded forward, such that the control panel having opened the access hole for allowing the water tank to come in and out may be disposed further downward than a path in which the water tank moves. Accordingly, the control panel does not serve as an obstacle that covers the access hole and the water tank, from the user's sight, such that the access hole (and the water tank) may be seen well while the water tank may be drawn or inserted. According to the present disclosure, the user does not need to bend to see the position of the access hole, ensuring improvement in ease of use and safety of the cooking appliance.

According to the present disclosure, the pushing member pushes the control panel with the predetermined gradient, and the opening operation of the control panel may be performed by using the self weight of the control panel, ensuring an automatic opening operation of the control panel simply based on a push of the control panel. According to the present disclosure, an automatic opening function of the control panel may be provided, and management and repairs in relation to the opening and closing structure of the control panel may be readily ensured, at low costs. According to the present disclosure, the control panel having an automatic opening function as described above may be provided, causing no inconvenience due to a manual manipulation and reducing the risk of injuries of the user. According to the present disclosure, the control panel disposed further downward than the path in which the water tank moves supports the water tank from below, and guides the movement path of the water tank, enabling the user to drawn and insert the water tank in a convenient and safe manner.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure The technical scope of protection of the subject matter of the disclosure is to be defined according to following claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking appliance, comprising:
a main body having a cooking space therein, the cooking space having a front that is opened;
a door provided at the front of the cooking space and configured to open and close the cooking space;
an electronic component space provided above the cooking space; and
a control panel provided at a front of the electronic component space, and configured to swivel downward and forward,
wherein:
the control panel swivels between a closing position in which the control panel blocks at least a portion of the electronic component space and an opening position in which the control panel is swiveled downward and forward,
the cooking appliance further comprises an opening module configured to push the control panel in the closing position forward and to move the control panel toward the opening position,
the opening module includes a pushing member that is rotatably provided, and
the pushing member is a cam configured to push the control panel forward at least once during a rotation of the cam,
opening module further includes a sensor configured to detect a position of the pushing member based on contacting at least a portion of the pushing member,
the opening module further includes a contact projection which protrudes from the pushing member and rotates together with the pushing member, and
the sensor generates a signal when the sensor contacts the contact projection.

2. The cooking appliance of claim 1, wherein the control panel swivels around an axis extending in a lateral direction of the main body, and the axis around which the control panel swivels is positioned further downward than a center of the control panel in an up-down direction.

3. The cooking appliance of claim 1, wherein the control panel is configured to swivel between a closing position in which the control panel blocks the electronic component space and an opening position in which the control panel is swiveled downward and forward.

4. The cooking appliance of claim 3, wherein a rear surface of the control panel faces rearward in the closing position, and the rear surface of the control panel faces upward in the opening position.

5. The cooking appliance of claim 3, wherein the cooking appliance further comprises a water tank provided in the electronic component space, the water tank is configured to be withdrawn through the front of the electronic component space, and the control panel is provided between the door and the water tank, in the opening position.

6. The cooking appliance of claim 3, wherein the cooking appliance further comprises a water tank provided in the electronic component space, and the water tank is configured to be withdrawn through the front of the electronic component space, and is provided further upward than the control panel swiveled to the opening position.

7. The cooking appliance of claim 1, further comprising:

a water tank provided in the electronic component space and configured to be withdrawn from the front of the electronic component space; and a front panel blocking at least a portion of a front of the electronic component space and provided between the electronic component space and the control panel, wherein an access hole is provided on the front panel and forms a passage through which the water tank passes when withdrawn through the front panel.

8. The cooking appliance of claim 7, wherein the access hole is placed further upward than the control panel when the control panel is swiveled downward and forward.

9. The cooking appliance of claim 1, wherein the cooking appliance further comprises a hinge module that supports the control panel such that the control panel swivels around a lower end of the control panel, the opening module tilts the control panel in the closing position forward to a predetermined gradient, and the control panel, after being tilted to the predetermined gradient by the opening module, continues to move to the opening position from the predetermined gradient due to a weight of control panel.

10. The cooking appliance of claim 1, wherein the sensor is provided above the pushing member, and the contact projection protrudes upward from the pushing member to contact the sensor during rotation of the pushing member.

11. The cooking appliance of claim 1, wherein the cooking appliance further comprises a hinge module configured to hingedly support the control panel such that the control panel swivels around the lower end of the control panel.

12. The cooking appliance of claim 11, wherein the cooking appliance further comprises a first front panel and a first portion of the first front panel is provided between the cooking space of the main body and the door, a second portion of the first front panel protrudes to above the cooking space, and the hinge module is coupled to at least one of the main body or the first front panel.

13. The cooking appliance of claim 12, wherein the cooking appliance further comprises a second front panel provided between the electronic component space and the control panel and blocking at least a portion of the front of the electronic component space, and the second front panel is coupled to the first front panel.

14. The cooking appliance of claim 13, wherein the first front panel comprises a protrusion protruding upward from a lateral end of the first front panel, and the second front panel is coupled to the protrusion.

15. A cooking appliance, comprising:

a main body having a cooking space therein, the cooking space having a front that is opened;

a door provided at the front of the cooking space and configured to open and close the cooking space;

an electronic component space provided above the cooking space; and a control panel provided at a front of the electronic component space, and configured to swivel downward and forward, wherein;

the cooking appliance comprises a hinge module configured to hingedly support the control panel such that the control panel swivels around the lower end of the control panel, the cooking appliance further comprises a first front panel and a first portion of the first front panel is provided between the cooking space of the main body and the door, a second portion of the first front panel protrudes to above the cooking space, the hinge module is coupled to at least one of the main body or the first front panel, the hinge module includes a hinge swivably coupled to the control panel, and a hinge case accommodating and supporting the hinge, the hinge case is provided in the electronic component space, the first front panel includes a protrusion protruding upward from a lateral end of the first front panel, and a front surface of the hinge case is provided at a rear of the protruding surface and is coupled to the protrusion.

16. The cooking appliance of claim 15, wherein a passage hole penetrates the protrusion in a front-rear direction, and the hinge passes through the protrusion through the passage hole.

* * * * *